(12) United States Patent
Sim et al.

(10) Patent No.: US 10,901,252 B2
(45) Date of Patent: Jan. 26, 2021

(54) DISPLAY DEVICE

(71) Applicant: SAMSUNG DISPLAY CO., LTD., Yongin-si (KR)

(72) Inventors: Jingyu Sim, Suwon-si (KR); Kwangsun You, Cheonan-si (KR); Dongjin Park, Gwangmyeong-si (KR); Junggil Oh, Hwasong-si (KR); Wonchul Lee, Seoul (KR); Byoungjin Jin, Yongin-si (KR); Jonghyeon Choi, Pyeongtaek-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 56 days.

(21) Appl. No.: 16/165,723

(22) Filed: Oct. 19, 2018

(65) Prior Publication Data
US 2019/0227368 A1    Jul. 25, 2019

(30) Foreign Application Priority Data
Jan. 25, 2018 (KR) ......................... 10-2018-0009206

(51) Int. Cl.
*G02F 1/1333* (2006.01)
*G02F 1/133* (2006.01)

(52) U.S. Cl.
CPC .... *G02F 1/133308* (2013.01); *G02F 1/13306* (2013.01); *G02F 2001/133317* (2013.01); *G02F 2001/133334* (2013.01); *G02F 2201/50* (2013.01); *G02F 2202/22* (2013.01)

(58) Field of Classification Search
CPC .............. G02B 6/0088; G06F 1/1637; G02F 2201/465; G02F 2001/133314
See application file for complete search history.

(56) References Cited

U.S. PATENT DOCUMENTS

| 6,411,353 B1 * | 6/2002 | Yarita ............. G02F 1/133308 349/150 |
| D661,672 S | 6/2012 | Kim |
| D664,957 S | 8/2012 | Kim |
| 9,459,483 B2 | 10/2016 | Shin et al. |

(Continued)

FOREIGN PATENT DOCUMENTS

| KR | 10-2015-0066615 | 6/2015 |
| KR | 10-2017-0049269 | 5/2017 |

(Continued)

*Primary Examiner* — Michael H Caley
*Assistant Examiner* — Jonathan Y Jung
(74) *Attorney, Agent, or Firm* — F. Chau & Associates, LLC

(57) ABSTRACT

A display device includes a display panel, a mold frame that has a support for a lower surface of the display panel, and a first side wall portion that vertically extends from the support; a flexible printed circuit board disposed outside the first side wall portion that connects the circuit board and the display panel; and a shielding case that includes a second bottom portion that covers a part of the flexible printed circuit board, and a third side wall portion that extends upward from the second bottom portion, is fastened to the first side wall portion and covers a part of the flexible printed circuit board. The first side wall portion has an opening, and the shielding case includes a hook that extends from the third side wall portion into the opening.

27 Claims, 23 Drawing Sheets

(56) References Cited

U.S. PATENT DOCUMENTS

| | | | |
|---|---|---|---|
| 2008/0048958 A1* | 2/2008 | Kim | G02F 1/133308 345/87 |
| 2009/0122220 A1* | 5/2009 | Ko | G02F 1/133308 349/58 |
| 2015/0177548 A1* | 6/2015 | Jeon | G02F 1/13452 349/12 |
| 2016/0014880 A1* | 1/2016 | Lee | H05K 5/02 361/752 |
| 2017/0123260 A1* | 5/2017 | Kim | G02F 1/133308 |
| 2017/0168345 A1* | 6/2017 | Wu | G02F 1/133308 |
| 2017/0192163 A1 | 7/2017 | Oh | |
| 2019/0204660 A1* | 7/2019 | Maemuko | G02F 1/133308 |

FOREIGN PATENT DOCUMENTS

| | | |
|---|---|---|
| KR | 10-2015-0081153 | 7/2017 |
| KR | 10-2017-0077683 | 7/2017 |
| KR | 10-2017-0079244 | 7/2017 |

* cited by examiner

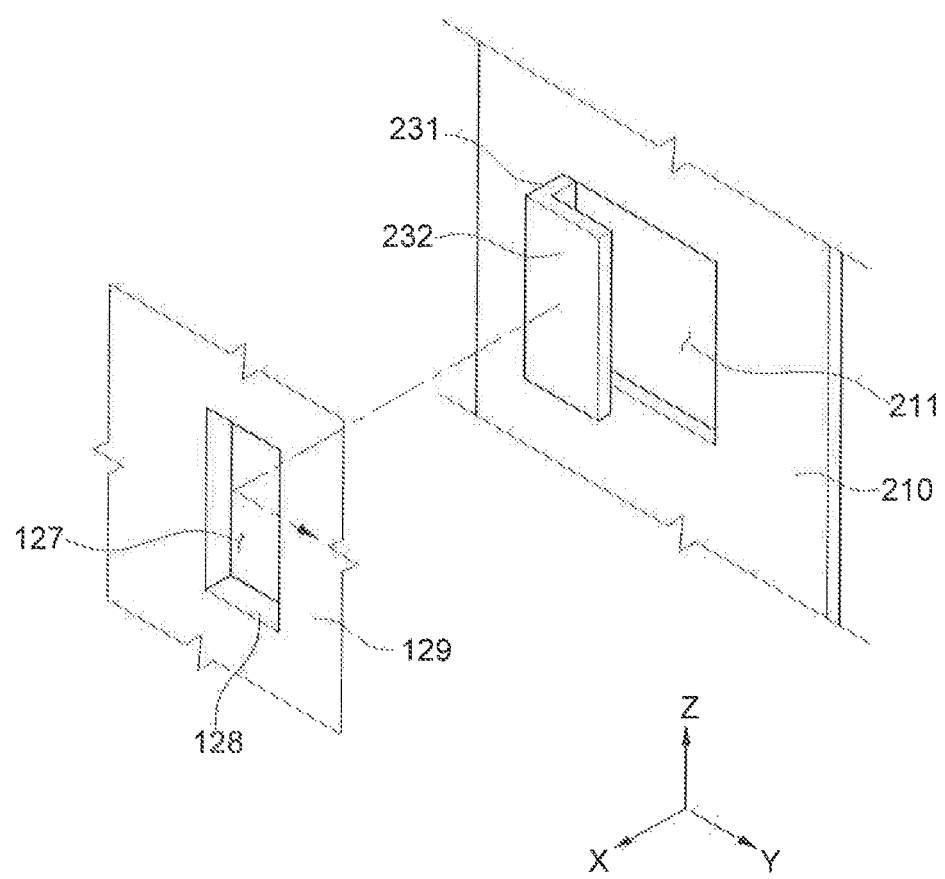

DISPLAY DEVICE

CROSS-REFERENCE TO RELATED APPLICATION

This application claims priority under 35 U.S.C. § 119 from, and the benefit of, Korean Patent Application No. 10-2018-0009206, filed on Jan. 25, 2018 in the Korean Intellectual Property Office (KIPO), the contents of which are herein incorporated by reference in their entirety.

TECHNICAL FIELD

Embodiments of the present disclosure are directed to a display device, and more particularly, to a display device that includes a shielding case.

DISCUSSION OF THE RELATED ART

Display devices can be classified into liquid crystal display ("LCD") devices, organic light emitting diode ("OLED") display devices, plasma display panel ("PDP") display devices and electrophoretic display devices based on a light emitting scheme thereof.

A display device includes a display panel for displaying images, various optical components that improve optical characteristics of the display panel, and a frame that accommodates the display panel and the various optical components therein.

A frame includes a mold frame that supports an edge of a back surface of the display panel and provides a space for accommodating the various optical components; a bottom chassis that accommodates various components such as the mold frame; and a top chassis that covers an edge of a from surface of the display panel.

Recently, a frameless display device has been introduced that omits the top chassis and in which the display panel is directly attached to the mold frame using, e.g., adhesive tape.

In an above-described frameless display device, a shielding case that covers a circuit board and a flexible printed circuit board, and a back cover that covers the shielding case, do not cover an upper surface of the display panel. Accordingly, a gap between the shielding case and the display panel can widen due to external impacts or a restoring force of the flexible printed circuit board. When the gap widens, a part of the flexible printed circuit board and a driving chip mounted on the flexible printed circuit board are exposed, resulting in poor appearance, and possibly damaging the circuit board due to electrostatic discharges.

A method of fixing a shielding case with adhesive tape has been suggested. However, when adhesive tape is used, it can be challenging to attach or detach the shielding case, and the adhesive force of the adhesive tape tends to decrease over time, which allows the gap to widen again.

SUMMARY

Embodiments of the present disclosure are directed to a display device in which a shielding case can be detachably fastened to stably maintain the coupling force.

According to an embodiment, a display device includes: a display panel; a mold frame that includes a support that supports a lower surface of the display panel, and a first side wall portion that extends from the support in a vertical direction; flexible printed circuit board disposed outside the first side wall portion and connected to the display panel; and a shielding case that includes a second bottom portion that covers a part of the flexible printed circuit board, and a third side wall portion that extends upward from the second bottom portion, is fastened to the first side wall portion and covers a part of the flexible printed circuit board. The first side wall portion includes an opening, and the shielding case includes a hook that extends from the third side wall portion into the opening.

The opening may penetrate the first side wall portion.

The opening does not penetrate the first side wall portion.

The hook may include: a horizontal portion that extends from the third side wall portion to the inside of the opening; and a vertical portion that extends from the inside of the opening in a direction parallel to the first side wall portion.

The horizontal portion may contact an upwardly facing surface of the opening.

The vertical portion may contact an inwardly facing surface of the first side wall portion.

The vertical portion may extend upward from the horizontal portion.

A height of the vertical portion may be greater than a height of the opening.

A size of the vertical portion may be substantially equal to or less than a size of the opening.

The horizontal portion may be perpendicular to the vertical direction.

The vertical portion may extend downward from the horizontal portion.

The vertical portion may extend horizontally from the horizontal portion in a direction perpendicular to the vertical direction.

The horizontal portion may be parallel to the vertical direction.

The vertical portion may extend horizontally from the horizontal portion in a direction perpendicular to the vertical direction.

The horizontal portion may contact a downwardly facing surface of the opening.

The display device may further include a bottom chassis that includes a first bottom portion and a second side wall portion that extends upward from the first bottom portion; a circuit board disposed on a lower surface of the first bottom portion and connected to the display panel by the flexible primed circuit board, wherein the second bottom portion is fastened to the first bottom portion and covers the circuit board; and a projection that separates the second bottom portion from the first bottom portion by a predetermined distance.

The display panel may include: a lower substrate supported by the support and an upper substrate on the lower substrate. An upper end of the third side wall portion may be higher than a lower surface of the upper substrate and lower than an upper surface of the display panel.

A length of the third side wall portion in a horizontal direction may be shorter than a length of the first side wall portion in a horizontal direction.

The display device may further include a back cover. The back cover may include: a third bottom portion that covers the first bottom portion and the second bottom portion; and a fourth side wall portion bent upward from the third bottom portion and that covers the first side wall portion, the second side wall portion, and the third side wall portion.

An upper end of the fourth side wall portion may have a height substantially equal to a height of an upper surface of the display panel.

The opening and the hook do not overlap the flexible printed circuit board.

The flexible printed circuit board may include a plurality of flexible printed circuit boards spaced apart from each other, and the opening and the hook may be located between the plurality of flexible printed circuit boards.

The second bottom portion may be fastened to the first bottom portion by a screw.

The display device may further include a tape that covers the opening.

According to an embodiment, a display device includes: a display panel; a mold frame that includes a support that supports a lower surface of the display panel, and a first side wall portion that extends from the support in a vertical direction; a bottom chassis that includes a first bottom portion and a second side wall portion that extends upward from the first bottom portion; a circuit board disposed on a lower surface of the first bottom portion; a flexible printed circuit board disposed outside the first side wall portion and that connects the circuit board and the display panel; and a shielding case that includes a second bottom portion fastened to the first bottom portion and that covers the circuit board and a part of the flexible printed circuit board, and a third side wall portion that extends upward from the second bottom portion, is fastened to the first side wall portion and covers a part of the flexible printed circuit board. The third side wall portion has an opening, and the mold frame includes a hook that extends from the first side wall portion into the opening.

The hook may include: a horizontal portion that extends inward from the first side wall portion; and a vertical portion that extends from an inside of the opening in a direction parallel to the third side wall portion.

The horizontal portion may contact a downwardly facing surface of the opening.

The vertical portion may contact an outwardly facing surface of the third side wall portion.

According to an embodiment, a display device includes: a display panel; a mold frame that includes a support that supports a lower surface of the display panel, and a first side wall portion that extends from the support in a vertical direction; a bottom chassis that includes a first bottom portion and a second side all portion that extends upward from the first bottom portion; a circuit board disposed on a lower surface of the first bottom portion; a flexible printed circuit board disposed outside the first side wall portion and that connects the circuit board and the display panel; and a shielding case that includes a second bottom portion fastened to the first bottom portion and that covers the circuit board and a part of the flexible printed circuit board, and a third side wall portion that extends upward from the second bottom portion, is fastened to the first side wall portion and covers a part of the flexible printed circuit board. The third side wall portion is fastened to at least one of the first side wall portion or the second side wall portion using a book.

The second side wall portion may be disposed outside the first side wall portion.

The third side wall portion may have an opening, and the second side wall portion may include a hook that extends from the first side wall portion into the opening.

The second side wall portion may have an opening, and the shielding case may include a hook that extends from the third side wall portion into the opening.

BRIEF DESCRIPTION OF THE DRAWINGS

FIG. 9A is a perspective view of a state in which a hook and an opening are separated from each other according to an embodiment of the present disclosure.

DETAILED DESCRIPTION

Figure 1:
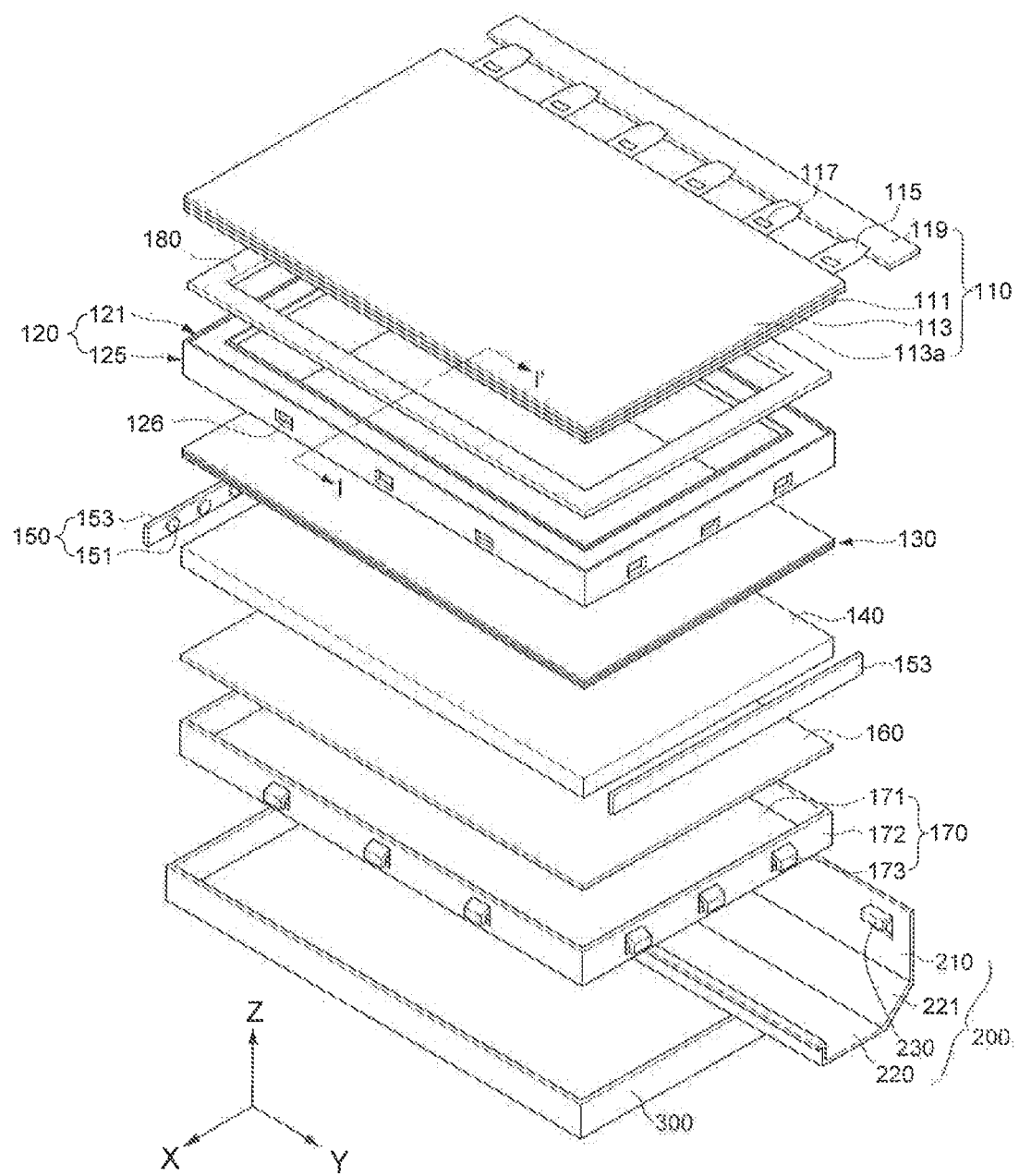
FIG. 1 is an exploded perspective view of a display device according to an embodiment of the present disclosure.

Exemplary embodiments will now be described more fully hereinafter with reference to the accompanying drawings. Although the disclosure may be variously modified and have several embodiments, exemplary embodiments are illustrated in the accompanying drawings and will be mainly described in the specification. However, the scope of the disclosure is not limited to the embodiments and should be construed as including all the changes, equivalents and substitutions included in the spirit and scope of the disclosure.

In the drawings, thicknesses of a plurality of layers and areas may be exaggerated for clarity and ease of description thereof. When a layer, area, or plate is referred to as being "on" another layer, area, or plate, it may be directly on the other layer, area, or plate, or intervening layers, areas, or plates may be present therebetween.

Throughout the specification, when an element is referred to as being "connected" to another element, the element is "directly connected" to the other element, or "electrically connected" to the other element with one or more intervening elements interposed therebetween.

"About" or "approximately" as used herein is inclusive of the stated value and means within an acceptable range of variation for the particular value as determined by one of ordinary skill in the art, considering the measurement in question and the error associated with measurement of the particular quantity (i.e., the limitations of the measurement system).

In the present disclosure, a display device according to an embodiment is assumed to be a liquid crystal display ("LCD") device, but embodiments are not limited thereto. A display device according to an embodiment may be an organic light emitting diode ("OLED") display device or a plasma display device.

In the present disclosure, a display device according to an embodiment is assumed to include an edge type backlight unit, but embodiments are not limited thereto. In an embodiment, the display device may be a direct type backlight unit or a corner type backlight unit.

Hereinafter, embodiments of the present disclosure will be described with reference to FIGS. 1 to 16.

Figure 2:
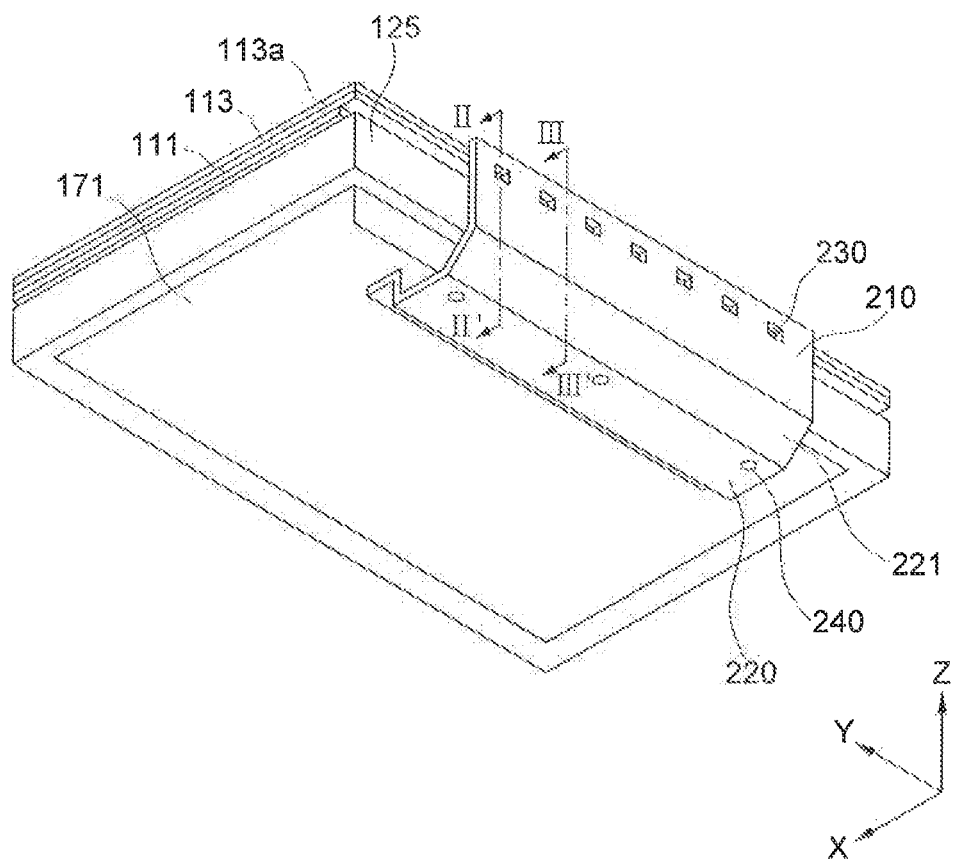
FIG. 2 is a perspective view of a display device of FIG. 1 in an assembled state.
Figure 3:
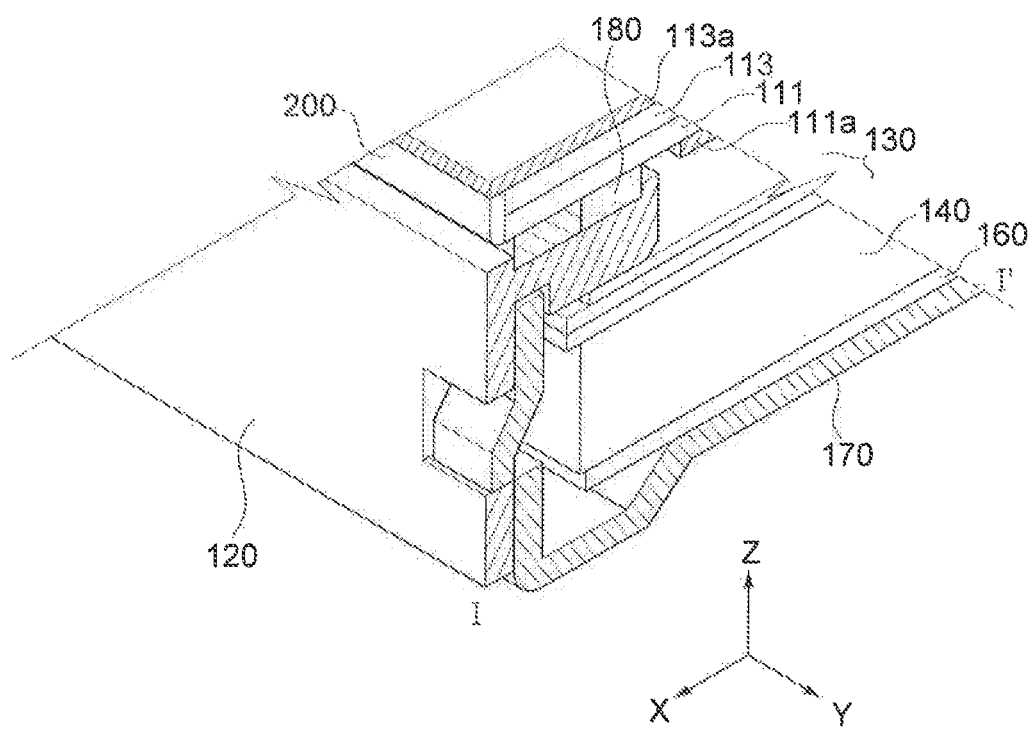
FIG. 3 is a cross-sectional perspective view taken along line I-I' in FIG. 2.
Figure 4:
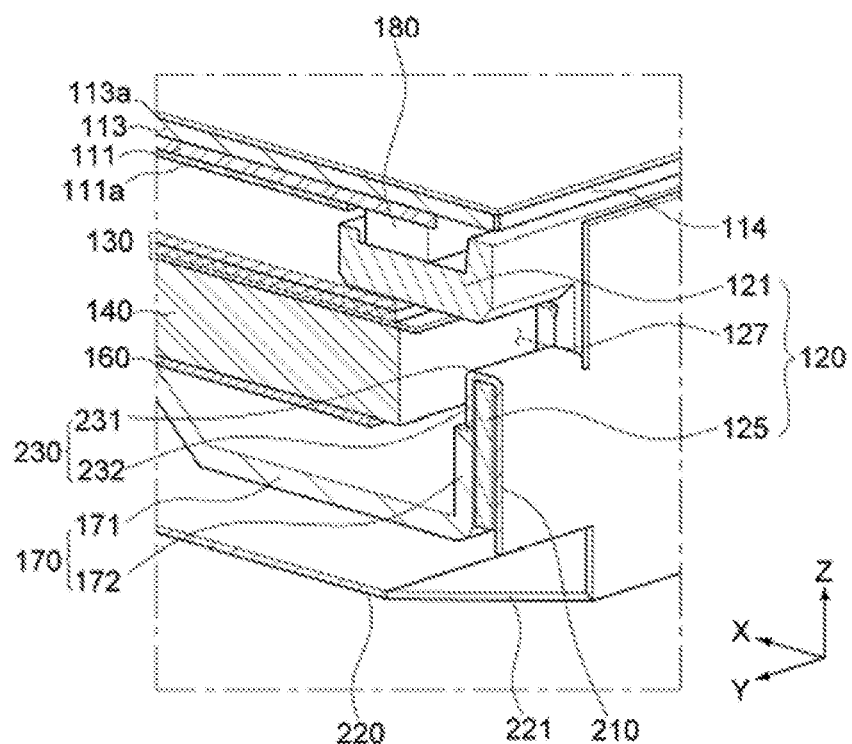
FIG. 4 is a cross-sectional perspective view taken along line II-II' in FIG. 2.

FIGS. 1 and 2 are exploded and assembled perspective views, respectively, of a display device according to an embodiment, and FIGS. 3 and 4 are cross-sectional perspective views taken along line I-I' in FIG. 1 and line II-II' in FIG. 2, respectively.

Referring to FIGS. 1 to 4, a display device according to an embodiment includes a display panel 110, a mold frame 120, an optical sheet 130, a light guide plate 140, a light source unit 150, a reflective sheet 160, a bottom chassis 170, a shielding case 200, and a back cover 300. Hereinafter, the mold frame 120, the optical sheet 130, the light guide plate 140, the light source unit 150, the reflective sheet 160, the bottom chassis 170 or the like are collectively referred to as a backlight unit.

According to an embodiment, the display panel 110 has a quadrangular plate shape and receives an externally provided electric signal to display images. The display panel 110 may be flat or curved. The display panel 110 includes a first or lower substrate 111, a second or upper substrate 113 that opposes the first substrate 111, and a liquid crystal layer (not illustrated) between the first substrate 111 and the second substrate 113.

According to an embodiment, the first substrate 111 includes a plurality of pixel electrodes arranged in a matrix, a thin film transistor that applies a driving voltage to each of the pixel electrodes, and various signal lines for transmitting signals that drive the pixel electrodes and the thin film transistor.

According to an embodiment, the second substrate 113 opposes the first substrate 111. The second substrate 113 includes a common electrode and a color filter. The color filters include red, green and blue color filters.

According to an embodiment, although the first substrate 111 includes a pixel electrode and the second substrate 113 includes a common electrode and a color filter, embodiments are not limited thereto. In an embodiment, the common electrode may be formed on the first substrate 111 and the pixel electrode may be funned on the second substrate 113. In addition, the common electrode and the color filter may be formed on the first substrate 111. In addition, the pixel electrode, the common electrode, and the color filter may be all formed on the first substrate 111.

According to an embodiment, the liquid crystal layer is interposed between the first substrate 111 and the second substrate 113, and is rearranged by an electric field formed between the pixel electrode and the common electrode. As such, the rearranged liquid crystal layer adjusts the transmittance of a light emitted from the backlight unit, and the adjusted light passes through the color filter to display images.

In addition, according to an embodiment, a lower polarizer 111a is further disposed on a lower surface of the first substrate 111 and an upper polarizer 113a is further disposed on an upper surface of the second substrate 113. The upper polarizer 113a has a planar area that corresponds to a planar area of the second substrate 113 of the display panel 110.

In addition, according to an embodiment, the lower polarizer 111a has a planar area that is less than or equal to a planar area of the first substrate 111 of the display panel 110. Referring to FIGS. 3 and 4, the lower polarizer 111a does not cover at least two of four edges of the first substrate 111 so that an adhesive tape 180 can directly contact a lower surface of the first substrate 111.

As illustrated in FIG. 3, according to an embodiment, a side sealing 114 is further disposed at side surfaces of the first substrate 111 and the second substrate 113. The side sealing 114 protects a side surface of the display panel 110. As illustrated in FIG. 4, the side sealing 114 is disposed only on a side surface of the second substrate 113 on the side where the flexible circuit board 115 is disposed. In addition, the side sealing 114 directly contacts the back surface of the upper polarizer 113a.

According to an embodiment, the upper polarizer 113a transmits a specific polarization state of externally received light and absorbs or blocks the remaining light. The lower polarizer 111a transmits a specific polarization state of light emitted from the backlight unit, and absorbs or blocks the remaining light.

Referring to FIG. 1, according to an embodiment, a circuit board 119 is disposed adjacent to at least ogre side of the display panel 110. The circuit board 119 transmits various control signals and a power signal that drive the display panel 110.

According to an embodiment, the display panel 110 and the circuit board 119 are electrically connected to each other by at least one flexible printed circuit board ("FPCB") 115. The FPCB 115 may be a chip on film (COF) or a tape carrier package (TCP), and the number of the FPCBs 115 can vary depending on the size and driving scheme of the display panel 110.

Referring to FIG. 4, according to an embodiment, a pad unit is disposed at one side edge of a back surface of the second substrate 113, and the FPCB 115 is attached to the pad unit.

According to an embodiment, a driving chip 117 is mounted on the FPCB 115. The driving chip 117 generates various driving signals that drive the display panel 110. The driving chip 117 may be a driver integrated circuit (IC) or a source IC in which a timing controller and a data driving circuit are integrated into one chip.

According to an embodiment, the mold frame 120 supports an edge of a back surface of the display panel 110 and provides a space for accommodating the optical sheet 130, the light guide plate 140, the light source unit 150, and the reflective sheet 160, etc.

According to an embodiment, the mold frame 120 has an annular polygonal frame shape that encloses a hollow space. For example, the mold frame 120 has an annular quadrangular frame shape that encloses an empty space. The mold frame 120 may have a single shape or may be as assembled from a plurality of separated pieces.

Referring to FIGS. 1, 2, 3 and 4, according to an embodiment, the mold frame 120 includes a support 121 that supports an edge off back surface of the display panel 110 and a side wall portion 125 bent upward from the support 121 in a vertical, Z-axis, direction. The side wall portion 125 has a coupling groove 126 that engages with a projection 173 of the bottom chassis 170 to be described below. In addition, the side wall portion 125 also has an opening 127 that engages with a hook of a shielding case to be described below According to an embodiment, the adhesive tape 180 is disposed on the support 121 that secures the display panel 110 and the mold frame 120 together. The adhesive tape 180 is a double-sided tape and a black tape that substantially prevents light leakage.

According to an embodiment the adhesive tape 180 is disposed at four edges of the back surface of the display panel 110. The adhesive tape 180 may be unitarily disposed in the form of a quadrilateral loop, as illustrated in FIG. 1, or may be separated into pieces. For example, the adhesive tape 180 may be disposed separately on each edge of the display panel 110, or may be disposed separately in arbitrary areas.

According to an embodiment, the optical sheet 130 is disposed on the light guide plate 140 and diffuses or collimates light received from the light guide plate 140. The optical sheet 130 includes a diffusion sheet, a prism sheet, and a protective sheet. The diffusion sheet, the prism sheet, and the protective sheet are sequentially stacked on the light guide plate 140 in the order listed.

According to an embodiment, the diffusion sheet diffuses the light received from the light guide plate 140, the prism sheet collimates light received from the diffusion sheet, and the protective sheet protects the prism sheet. Light that passes through the protective sheet is directed toward the display panel 110.

According to an embodiment, the light guide plate 140 uniformly emits the light received from the light source unit 150 to the display panel 110. The light guide plate 140 has a quadrilateral plate shape, but embodiments are not limited thereto. When a light emitting diode (LED) chip is used as a light source, the light guide plate 140 may have various forms that include grooves, projections, etc., depending on the position of the light source.

According to an embodiment, although referred to as a plate for ease of description, the light guide plate 140 may be a sheet or a film for reducing a thickness the display device. That is, the light guide plate 140 is to be understood as for a device that guides light.

According to an embodiment, the light guide plate 140 includes a light transmitting material that includes, for example, acrylic resins, such as polymethylmethacrylate (PMMA) or polycarbonate (PC) to efficiently guide light.

According to an embodiment, the light source unit 150 includes a light source 151 and a light source substrate 153 on which the light source 151 is disposed. The light source 151 may be disposed at an edge portion or on a light incident side surface of the light guide plate 140. That is, the light source 151 emits light toward the edge portion or the light incident side surface of the light guide plate 140. The light source 151 includes at least one light emitting diode ("LED") or an LED chip. For example, the light source 151 can be a gallium nitride (GaN)-based LED chip that emits blue light.

According to an embodiment, the number of light sources 151 can vary depending on the size and luminance uniformity of the display panel 110. The light source substrate 153 may be a printed circuit board ("PCB") or a metal PCB.

According to an embodiment, the light source unit 150 may be formed on one side surface, opposite side surfaces, or all four side surfaces of the light guide plate 140, depending on the size and luminance uniformity of the display panel 110. That is, the light source unit 150 is formed on at least one edge portion of the light guide plate 140.

According to an embodiment, a wavelength converter is disposed between the light source unit 150 and the light guide plate 140. The wavelength converter includes a material that converts the wavelength of light. For example, the wavelength converter converts some of the blue light emitted from a blue LED light source into red and green light, to generate white light.

According to an embodiment, the reflective sheet 160 includes a reflective material, such as polyethylene terephthalate (PET). One surface of the reflective sheet 160 is coated with a diffusion layer that includes, for example, titanium dioxide. In addition, the reflective sheet 160 may include a metal, such as silver (Ag).

According to an embodiment, the bottom chassis 170 is coupled to the mold frame 120 and accommodates the optical sheet 130, the light guide plate 140, the light source unit 150, and the reflective sheet 160. The bottom chassis 170 holds the framework of the display device and protects various components accommodated therein.

According to an embodiment, the bottom chassis 170 includes a bottom portion 171, side wall portions 172 that extend up from the bottom portion 171 in a Z-axis direction, and projections 173 that protrude outward from the side wall portion 172.

According to an embodiment, the projection 173 can be inserted into the coupling groove 126 of the mold frame 120 to couple the mold frame 120 and the bottom chassis 170 to each other. However, embodiments are not limited thereto, and the mold frame 120 and the bottom chassis 170 may be coupled to each other by various other methods known in the art.

According to an embodiment, the bottom chassis 170 includes a rigid metal that can efficiently dissipate heat. For example, the bottom chassis 170 includes at least one of stainless steel, aluminum, an aluminum alloy, magnesium, a magnesium alloy, copper, a copper alloy, or an electrogalvanized steel sheet.

According to an embodiment, the shielding case 200 includes a bottom portion 220, a side wall portion 210 that extends up from the bottom portion 220 in a Z-axis direction, and a hook 230 that protrudes inward. The side wall portion 210 of the shielding case 200 fastens to the side wall portion 125 of the mold frame 120 using the hook 230, and the bottom portion 220 of the shielding case 200 fastens to the bottom portion 171 of the bottom chassis 170 using a screw, etc., and thus the circuit board 119 disposed on a back surface of the bottom chassis 170 and the FPCB 115 disposed outside the mold frame 120 can be covered by the above structure.

According to an embodiment, the shielding case 200 includes a rigid metal that can efficiently radiate heat. For example, the shielding case 200 includes at least one of stainless steel, aluminum, an aluminum alloy, magnesium, a magnesium alloy, copper, a copper alloy, or electrogalvanized steel sheet.

According to an embodiment, the back cover 300 includes a bottom portion which covers the bottom portion 220 of the shielding case 200 and the bottom portion 171 of the bottom chassis 170, and side wall portions bent up from the bottom portion in the Z-axis direction that cover the side wall portion 210 of the shielding case 200, the side wall portion 125 of the mold frame 120, and a side surface of the display panel 110.

Hereinafter, a structure of the shielding case 200 will be described in more detail with reference to FIGS. 4 to 7.

Figure 5:
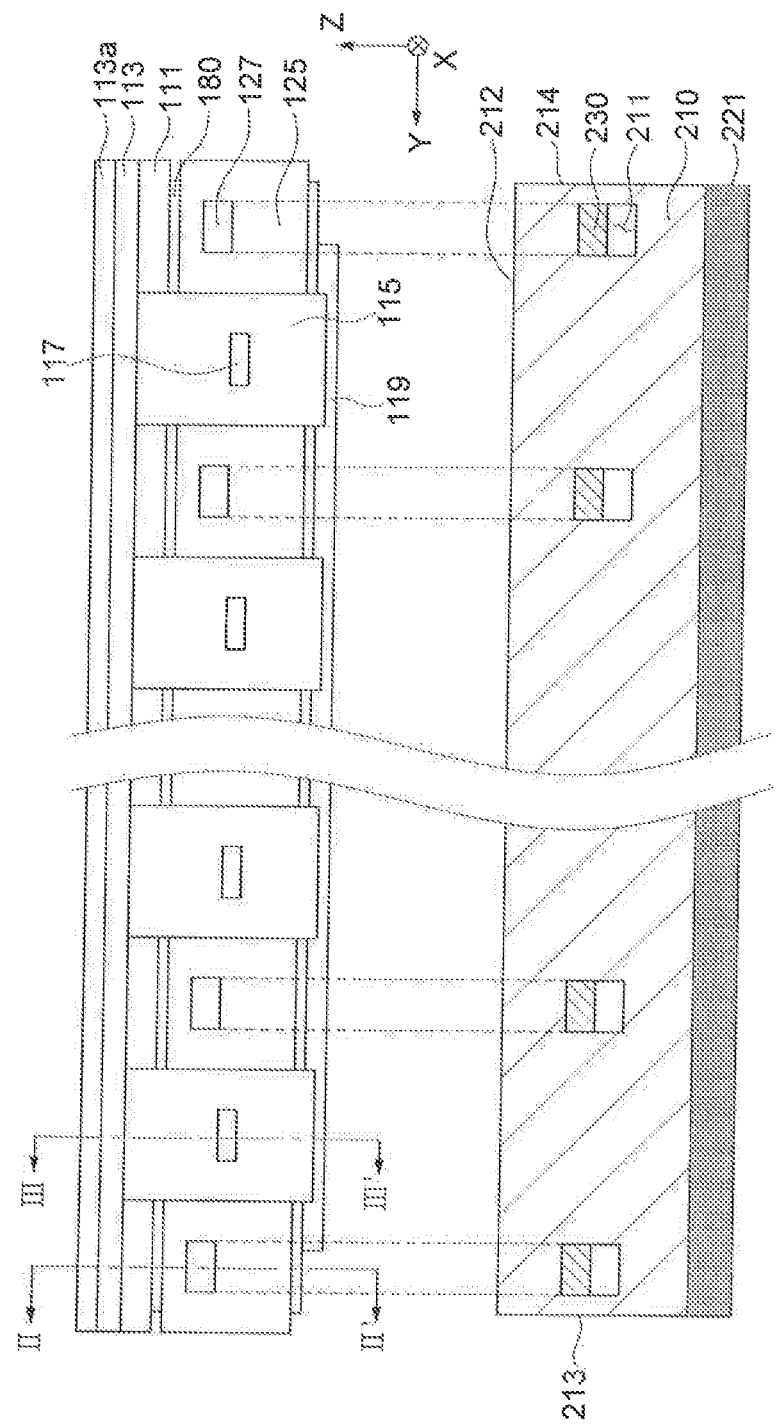
FIG. 5 is a side view of a display device of FIG. 1.
Figure 6:
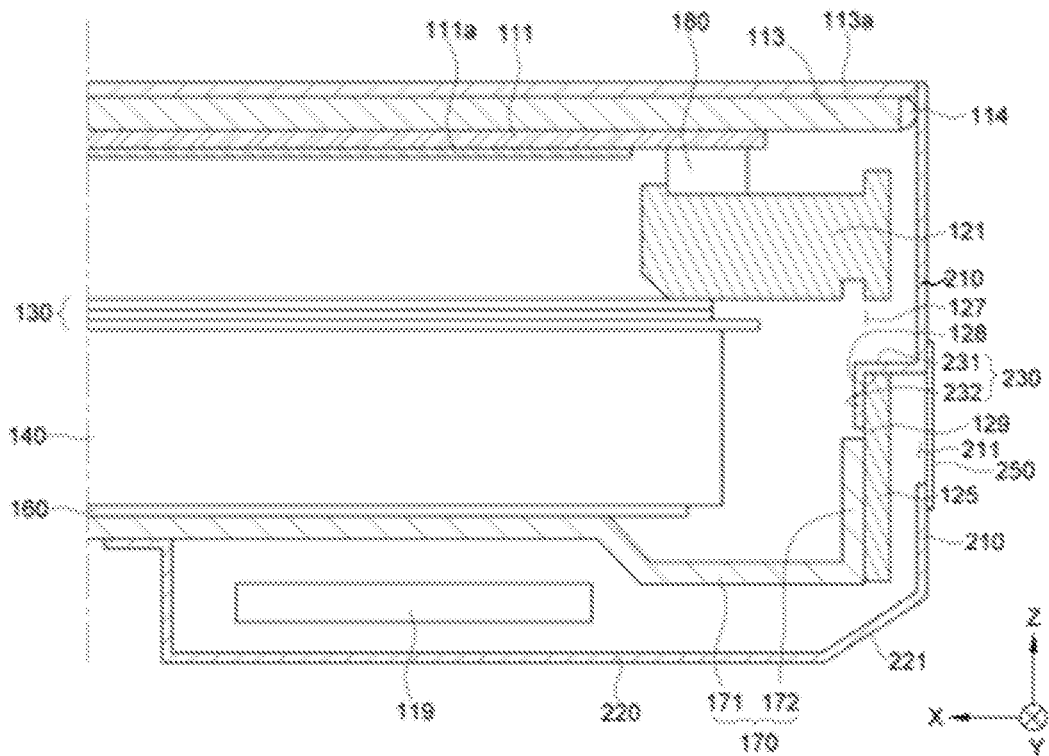
FIG. 6 is a cross-sectional perspective view taken along line II-II' of FIG. 5.
Figure 7:
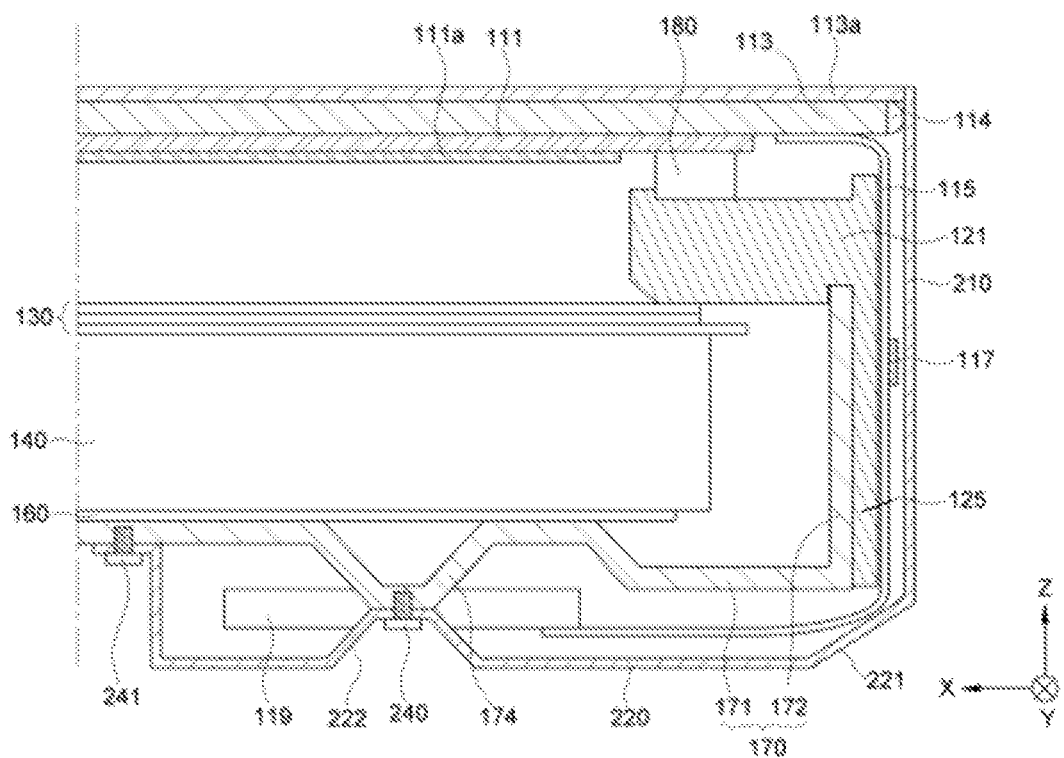
FIG. 7 is a cross-sectional perspective view taken along line of FIG. 5.

FIG. 5 is a side view of a display device of FIG. 1, and FIGS. 6 and 7 are cross-sectional perspective views taken along line II-II' and III-III' of FIG. 5, respectively.

Referring to FIGS. 5 to 7, according to an embodiment, the circuit board 119 is fastened to a back surface of the bottom chassis 170, and the display panel 110 and the circuit board 119 are connected to each other through FPCB 115 outside the mold frame 120. FPCB 115 includes a plurality of FPCBs that are spaced apart from each other at predetermined intervals. The side wall portion 210 of the shielding case 200 covers an exposed portion of the FPCB 115. That is, there is a predetermined gap between the side wall portion 210 of the shielding case 200 and the side wall portion 125 of the mold frame 120, and the FPCB 115 is disposed in the gap between the side wall portion 125 of the mold frame 120 and the side wall portion 210 of the shielding case 200. The FPCB 115 applies a restoring force in an outward, −X direction to the side wall portion 210 of the shielding case 200.

According to an embodiment, the opening 127 is formed in the side wall portion 125 of the mold frame 120, the hook 230 is formed at the side wall portion 210 of the shielding case 200, and hook 230 is inserted into the opening 127 when coupling the side wall portion 125 of the mold frame 120 and the side wall portion 210 of the shielding case 200 to each other. The opening 127 and the hook 230 are located at positions that do not overlap the FPCB 115. The openings 127 and the hooks 230 are located between the FPCBs 115 or at opposite ends of the plurality of FPCBs 115.

According to an embodiment, a length of the side wall portion 210 of the shielding case 200 in a Y-axis direction between opposites sides 213 and 214 of the side wall portion 210 is less than a length in the Y-axis direction of the side wall portion 125 of the mold frame 120.

As illustrated in FIGS. 6 and 7, according to an embodiment, a height of an upper end 212 of the side wall portion 210 of the shielding case 200 is greater than or substantially equal to a height of an upper surface of the first substrate 111. The height of the upper end 212 is less than or substantially equal to a height of an uppermost surface of the display panel, such as an upper surface of the upper polarizer 113a. A sealing member may contact the side wall portion 210 of the shielding case 200 or be spaced apart from the side wall portion 210 by a minimum distance to substantially prevent the FPCB 115 from being exposed.

According to an embodiment, one side of the bottom portion 220 of the shielding case 200 includes a corner portion 221 which is obliquely connected to the side wall portion 210 of the shielding case 200. An elastic portion of the bottom portion 220 or the corner portion 221 of the shielding case 200 applies a downward force to the side wall portion 210 of the shielding case 200 in a −Z direction.

Referring to FIG. 7, according to an embodiment, an end of the bottom portion 220 of the shielding case 200 is coupled to the bottom portion 171 of the bottom chassis 170 using a screw 241. A projection 174 of the bottom chassis 170 protrudes downward from the bottom portion 171 of the bottom chassis 170 in a −Z direction, and a projection 222 of the shielding case 200 protrudes upward from the bottom portion 220 of the shielding case 200 in a +Z direction. The two projections 174 and 222 are coupled to each other using a screw 240. The two projections 174 and 222 support and secure the circuit board 119, and secure the bottom portion 220 of the shielding case 200 at a predetermined distance from the bottom portion 171 of the bottom chassis 170. Each of the projections 174 and 222 includes a plurality of projections spaced apart in a Y direction at a predetermined interval.

According to an embodiment, the shielding case 200 is formed as a single flat plate. For example, the shielding case 200 can be formed by pressing a metal sheet. Accordingly, the hook 230 is formed by cutting and bending the side wall portion 210 of the shielding case 200, and an opening 211 corresponding to the shape of the hook 210 is formed at the side wall portion 210 of the shielding case 200. As illustrated in FIG. 6, the opening 211 is a through-hole surrounded on all four sides. Alternatively, as illustrated in FIG. 4, the opening 211 may be opened and not enclosed in a certain direction, such as an upward direction. In addition, the opening 211 may be a groove formed in the side wall that does not penetrate through the side wall, as described below.

Referring to FIGS. 4 and 6, according to an embodiment, the hook 230 includes a horizontal portion 231 and a vertical portion 232. The horizontal, portion 231 extends into the opening 127 from the side wall portion 210 of the shielding case 200. The horizontal portion 231 is perpendicular to the side wall portion 210 of the shielding case 200. The vertical portion 232 extends downward from an end of the horizontal portion 231 in the −Z direction. The vertical portion 232 is parallel to the side wall portion 210 of the shielding case 200. The horizontal portion 231 contacts an upwardly facing surface 128 of the opening 127 to restrict downward movement of the side wall portion 210 of the shielding case 200 in the −Z direction. The vertical portion 232 contacts a surface of the side wall portion 125 of the mold frame 120 that faces inward to restrict outward movement of the side wall portion 210 of the shielding case 200 in the −X direction. For reference, FIGS. 4 and 6 show different positions of the openings, which will be described below.

According to an embodiment, the side wall portion 172 of the bottom chassis 170 is fastened to the side wall portion 125 of the mold frame 120, as shown in FIG. 3. As illustrated in FIG. 6, an opening is formed in the side wall portion 172 of the bottom chassis 170 so that the vertical portion 232 can contact an inner side surface 129 of the side wall portion 125 of the mold frame 120. As illustrated in FIG. 7, the bottom portion 171 of the bottom chassis 170 at an area that overlaps the FPCB 115 extends to the support 121 of the mold frame 120.

As illustrated in FIGS. 4 and 6, according to an embodiment, an opening is formed in the following: the side wall portion 172 of the bottom chassis 170, the side wall portion 125 of the mold frame 120, and the side wall portion 210 of the shielding case 200. Accordingly, a tape 250 that covers the opening 211 can be attached to the side wall portion 210 of the shielding case 200. The tape 250 is a black tape that substantially prevents light leakage.

Hereinafter, a structure of the hook 230 and the opening 127 will be described in detail with reference to FIGS. 8A to 13B.

Figure 8A:
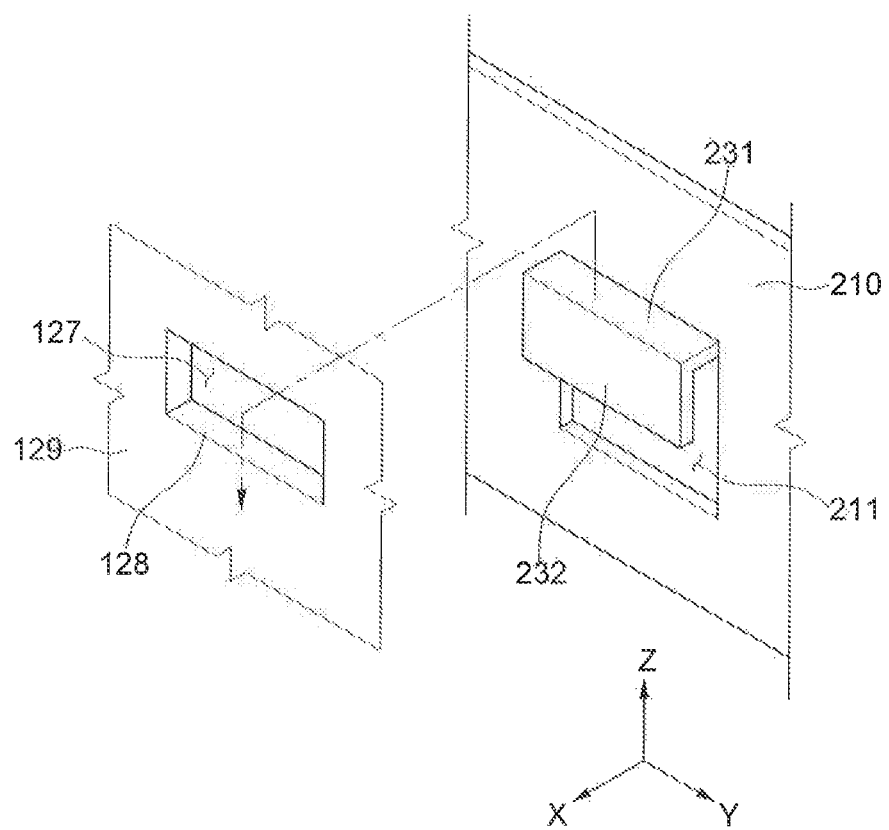
FIG. 8A is a perspective view of a state in which a hook and an opening are separated from each other according to an embodiment of the present disclosure.
Figure 8B:
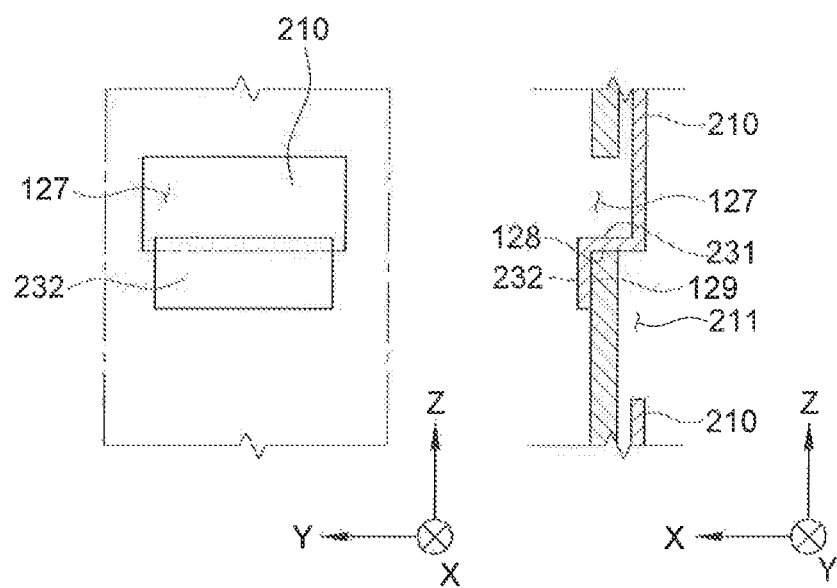
FIG. 8B is a front view and a cross-sectional view of FIG. 8A in which the hook and the opening are coupled to each other.
Figure 8C:
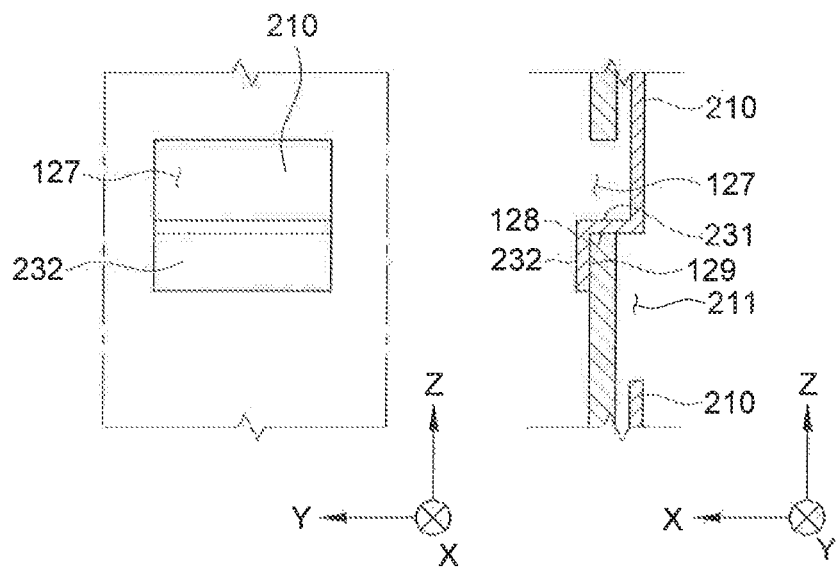
FIGS. 8C and 8D are front views in which the hook and the opening are coupled to each other according to an embodiment.
Figure 8D:
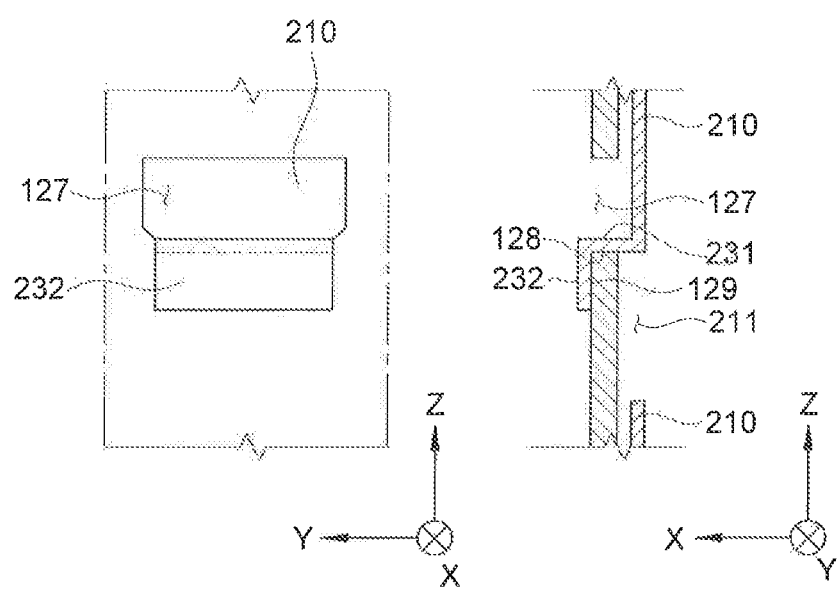

FIG. 8A is a perspective view of a state in which a hook and an opening are separated from each other according to an embodiment of the present disclosure, FIG. 8B is a front view and a cross-sectional view of FIG. 8A in which the hook and the opening are coupled to each other, and FIGS. 8C and 8D are front views in which the hook and the opening are coupled to each other according to an alternative embodiment.

Referring to FIGS. 8A to 8D, according to an embodiment, the hook 230 includes a horizontal portion 231 and a vertical portion 232. The horizontal portion 231 is a flat plate perpendicular to the side wall portion 210 of the shielding case 200 and parallel to an X-Y planar direction. The vertical portion 232 is a flat plate perpendicular to the horizontal direction and parallel to the side wall portion 210 of the shielding case 200. That is, the horizontal portion 231 is perpendicular to the vertical, Z-axis direction, and the vertical portion 232 is perpendicular to a depth, X-axis direction.

According to an embodiment, the horizontal portion 231 has a depth that corresponds to the sum of a thickness of the side wall portion 125 of the mold frame 120 and a distance between the side wall portion 125 of the mold frame 120 and the side wall portion 210 of the shielding case 200. The vertical portion 232 has a predetermined height that prevents separation of the side wall portion 210 of the shielding case 200. The horizontal portion 231 and the vertical portion 232 have a predetermined width in the Y-axis direction, perpendicular to the vertical direction and parallel to the side wall portion 210 of the shielding case 200). The size of the opening 127 is substantially equal to or larger than the size of the vertical portion 232.

According to an embodiment, the horizontal portion 231 is bent along a line in the width direction and extends out from the side wall portion 210 of the shielding case 200 so as to contact the upwardly facing surface 128 of the opening 127, and the vertical portion 232 is bent along a line in the width direction and extends down from the horizontal portion 231 to contact the inner side surface 129 of the opening 127. The vertical portion 232 extends downward from the horizontal portion 231, overlaps the opening 211, but does not overlap the opening 127. Accordingly, the opening 127 overlaps the side wall portion 210 of the shielding case 200 and is not externally exposed.

As illustrated in FIG. 8B, according to an embodiment, a vertical length and a width of the vertical portion 232 are less than a length of the opening 127, and thus coupling of the side wall portion 210 of the shielding case 200 is facilitated.

On the other hand, as illustrated in FIG. 8C, according to an embodiment, a width of the vertical portion 232 is substantially equal to the width of the opening 127. The height of the vertical portion 232 is greater than or substantially equal to the length of the opening 127. Accordingly, movement of the side wall portion 210 of the shielding case 200 in the width direction may be completely restricted.

Alternatively, according to an embodiment, as illustrated in FIG. 8D, a width of the opening 127 is substantially equal to a width of the horizontal portion 231 on the upwardly facing surface 128, and the width of the opening 127 increases with increasing distance from the upwardly facing surface 128. Accordingly, coupling of the side wall portion 210 of the shielding case 200 can be facilitated, while movement of the side wall portion 210 of the shielding case 200 can be effectively restricted. The structure described with reference to FIGS. 8C and 8D can be incorporated into all openings 127 and 211 described below, and the descriptions thereof will be omitted.

According to a present embodiment, the hook 230 is inserted downward into the opening 127 to couple the shielding case 200 and the mold frame 120 to each other. Thus, to facilitate coupling, an extra space having a height greater than the vertical portion 232 is provided between the bottom portion 220 of the shielding case 200 and the bottom portion 171 of the bottom chassis 170.

Figure 9B:
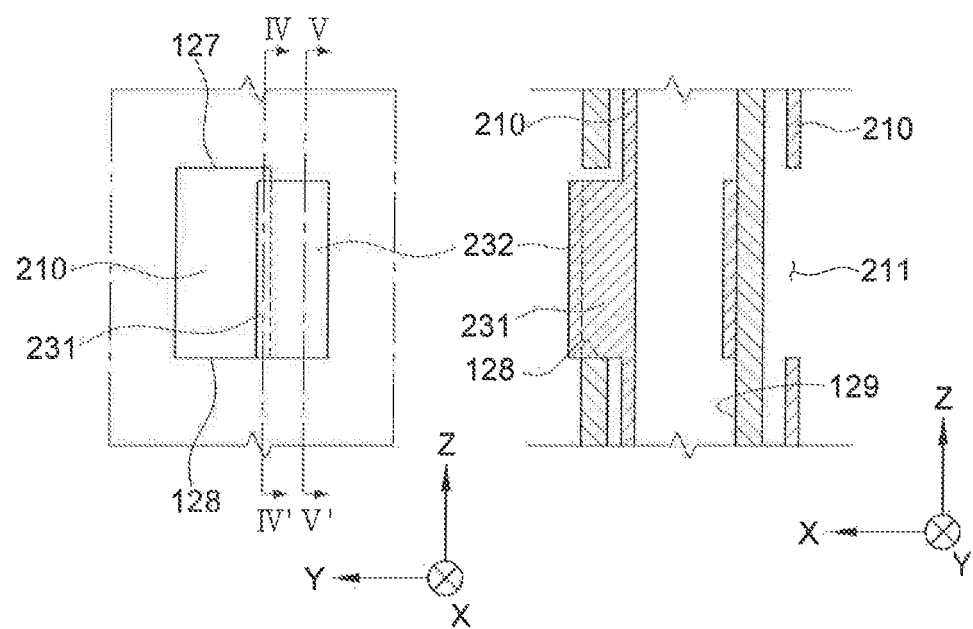
FIG. 9B is a front view and a cross-sectional view of FIG. 9A in which the hook and the opening are coupled to each other.
Figure 9C:
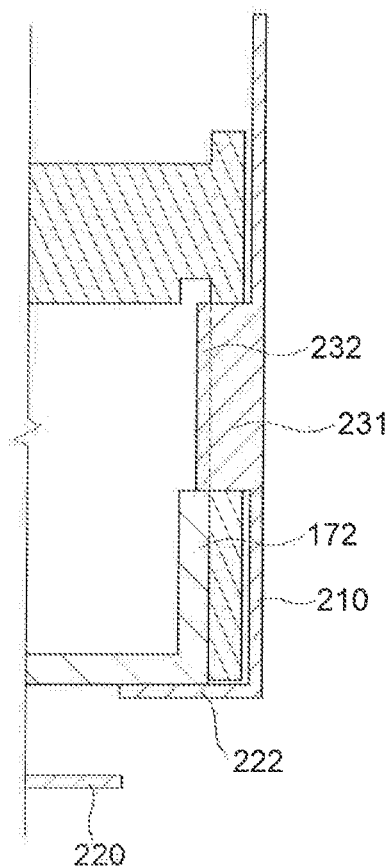
FIG. 9C is a cross-sectional view in which the hook and the opening are coupled to each other according to an embodiment.

FIG. 9A is a perspective view of a stale in which a hook and an opening are separated from each other according to an embodiment of the present disclosure, FIG. 9B is a front view and a cross-sectional view of FIG. 9A in which the hook and the opening are coupled to each other, and FIG. 9C is a cross-sectional view in which the book and the opening are coupled to each other according to an alternative embodiment. Redundant descriptions in common with FIGS. 8A to 8D will be omitted.

Referring to FIGS. 9A to 9D, according to an embodiment, a horizontal portion 231 is a flat plate perpendicular to a side wall portion 210 of a shielding case 200 and parallel to an X-Z planar direction. A vertical portion flat plate perpendicular to the X-axis direction and parallel to the side wall portion 210 of the shielding case 200. That is, the horizontal portion 231 is perpendicular to the width direction, and the vertical portion 232 is perpendicular to the depth direction.

According to an embodiment, the horizontal portion 231 has a depth that corresponds to the sum of a thickness of a side wall portion 125 of a mold frame 120 and a distance between the side wall portion 125 of the mold frame 120 and the side wall portion 210 of the shielding case 200. The vertical portion 232 has a predetermined width that can prevent separation of the side wall portion 210 of the shielding case 200. The horizontal portion 231 and the vertical portion 232 have predetermined heights.

According to an embodiment, the horizontal portion 231 is bent along a vertical line and extends from the side wall portion 210 of the shielding case 200, so that a lower side surface of the horizontal portion 231 contacts one side of an upwardly facing surface 128 of an opening 127. The vertical portion 232 is bent along a vertical line and extends from the horizontal portion 231 to contact an inner side surface 129 of the side wall portion 125 of the mold frame 120. The vertical portion 232 extends in the width direction from the horizontal portion 231 and overlaps an opening 211 of the shielding case 200 and does not overlap the opening 127 of the mold frame 120. Accordingly, the opening 127 of the mold frame 120 overlaps the side wall portion 210 of the shielding case 200 and is not externally exposed.

According to a present embodiment, upward movement of the side wall portion 210 of the shielding case 200 as well as downward movement thereof are restricted by the horizontal portion 231. In addition, hook 230 of the shielding case 200 is inserted in the width direction into the opening 127 of the mold frame 120 to couple the shielding case 200 and the mold frame 120 together. Accordingly, no extra space need be secured below the side wall portion 210 of the shielding case 200 for coupling. Accordingly, as illustrated in FIG. 9C, the shielding case 200 may include a support 222 which directly contacts a bottom portion 171 of a bottom chassis 170.

Figure 10A:
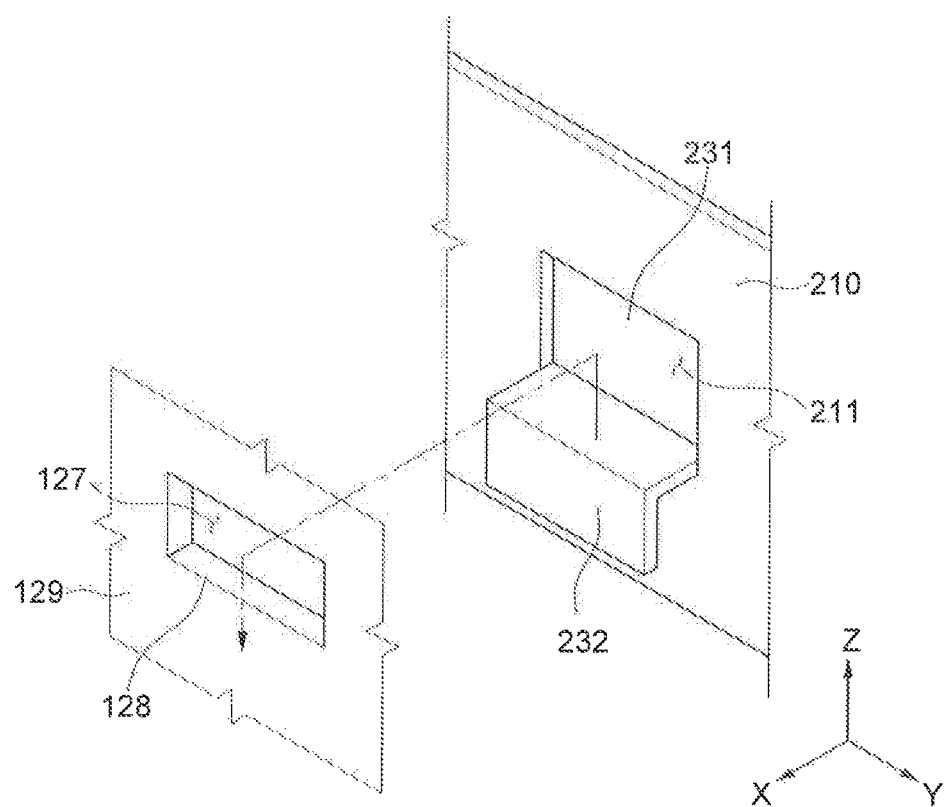
FIG. 10A is a perspective view of a state in which a hook and an opening are separated from each other according to an embodiment of the present disclosure.
Figure 10B:
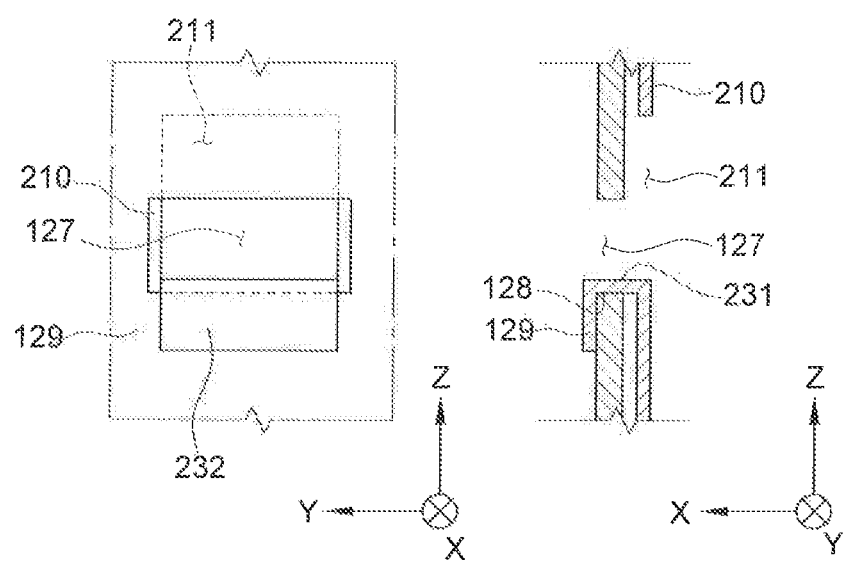
FIG. 10B is a front view and a cross-sectional view of FIG. 10A in which the hook and the opening are coupled to each other.

FIG. 10A is a perspective view of a state in which a hook and an opening are separated from each other according to an embodiment of the present disclosure, and FIG. 10B is a front view and a cross sectional view of FIG. 10A in which the hook and the opening are coupled to each other. In the embodiment illustrated in FIGS. 10A and 10B, the position of an opening 211 of a shielding case 200 differs from that of the embodiment described with reference to FIGS. 8A and 8B.

According to an embodiment, a vertical portion 232 extends downward from a horizontal portion 231, does not overlap the opening 211 of the shielding case 200, and does not overlap an opening 127 of a mold frame 120. Accordingly, the opening 127 of the mold frame 120 overlaps the opening 211 of the shielding case 200 and is externally exposed. Accordingly, as described above, a tape 250 that covers the exposed openings 127 and 211 can be attached to the side wall portion 210 of the shielding case 200. Alternatively, the tape 250 can be attached to both the side wall portion 210 of the shielding case 200 and a side wall portion 125 of the mold frame 120.

Figure 11A:
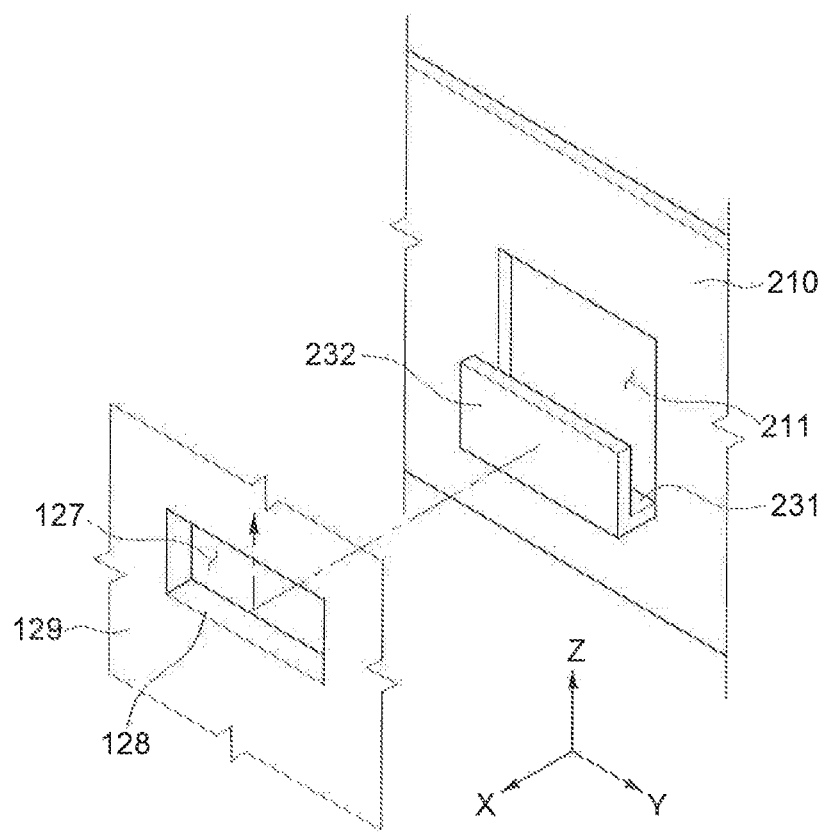
FIG. 11A is a perspective view of a state in which a hook and an opening are separated from each other according to an embodiment of the present disclosure.
Figure 11B:
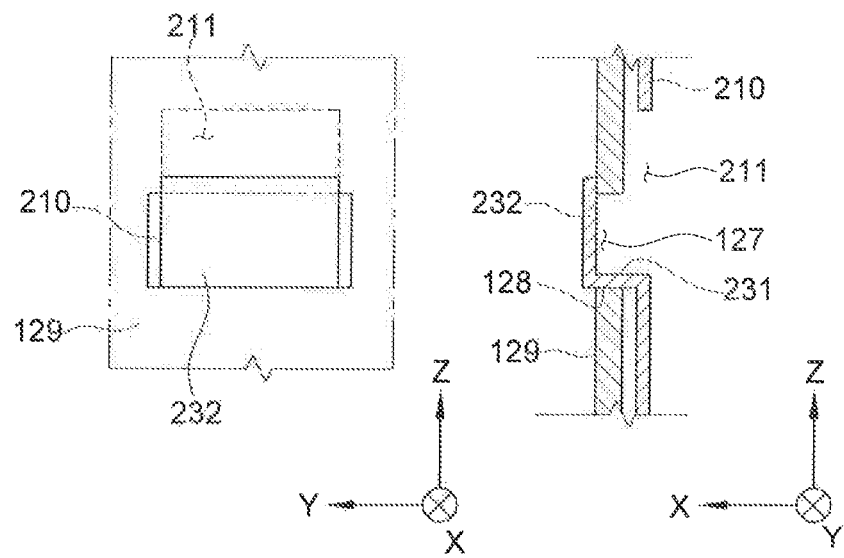
FIG. 11B is a front view and a cross-sectional view of FIG. 11A in which the hook and the opening are coupled to each other.

FIG. 11A is a perspective view of a state in which a hook and an opening are separated from each other according to an embodiment of the present disclosure, and FIG. 11B is a front view and a cross-sectional view of FIG. 11A in which the hook and the opening are coupled to each other. In the embodiment illustrated in FIGS. 11A and 11B, an extension direction of a vertical portion 232 differs from the embodiment described with reference to FIGS. 8A and 8B.

According to an embodiment, a horizontal portion 231 is bent along a width line and extends from a side wall portion 210 of a shielding case 200 to contact an upwardly facing surface 128 of an opening 127. The vertical portion 232 is bent along a width line and extends upward from the horizontal portion 231. Accordingly, the vertical portion 232 contacts an inner side surface 129 of a side wall portion 125 of a mold frame 120, and more specifically, the inner side surface 129 upward from the opening 127. A height of the vertical portion 232 is greater than a height of the opening 127. Accordingly, the vertical portion 232 extends upward from the horizontal portion 231 and overlaps an opening 211 of the shielding case 200 and the opening 127 of the mold frame 120. Accordingly, the opening 127 of the mold frame 120 overlaps the vertical portion 232 and the side wall portion 210 of the shielding case 200 and is not externally exposed in the depth direction.

According to a present embodiment, since the height of the vertical portion 232 is greater than the height of the opening 127 of the mold frame 120, a hook 230 cannot be inserted into the opening 127 in the depth direction. Accordingly, the hook 230 is inserted into the opening 127 when the shielding case 200 is inclined so that an upper side of the side wall portion 210 of the shielding case 200 is brought closer to the side wall portion 125 of the mold frame 120 than a lower side thereof, and then a bottom portion 220 of the shielding case 200 can be coupled to a bottom portion 171 of a bottom chassis 170.

According to a present embodiment, downward movement of the side wall portion 210 of the shielding case 200 is restricted by the horizontal portion 231, and the opening 127 is covered by the vertical portion 232.

Figure 11C:
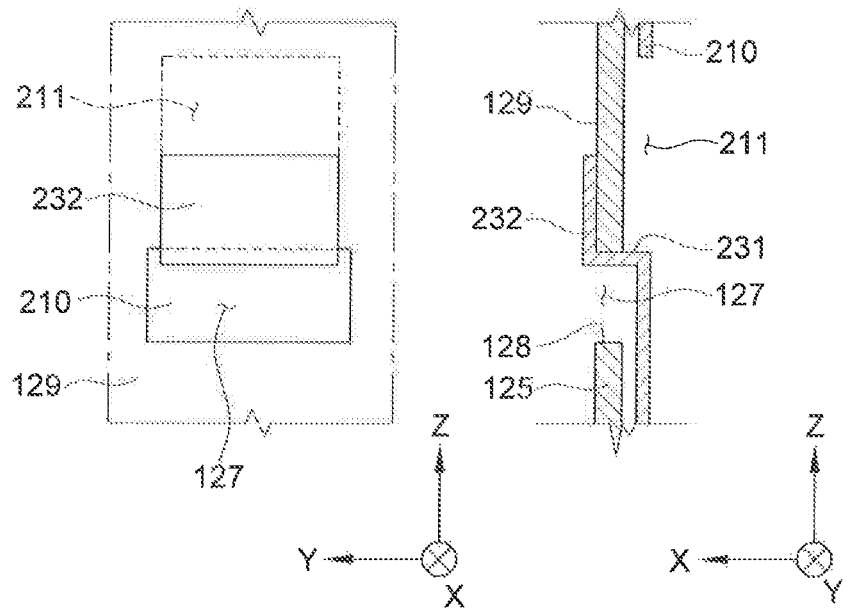
FIG. 11C is a front view and a cross-sectional view in which the hook and the opening are coupled to each other.

FIG. 11C is a front view and a cross-sectional view in which the hook and the opening are coupled to each other.

In an embodiment illustrated in FIG. 11C, the position of an opening 127 of a mold frame 120 which a horizontal portion 231 contacts differs from an embodiment described with reference to FIGS. 11A and 11B.

According to an embodiment, the horizontal portion 231 is bent along a width line and extends from a side wall portion 210 of a shielding case 200, so as to contact a downwardly facing surface opposite to the upwardly facing surface 128 of the opening 127. A vertical portion 232 is bent upward from the horizontal portion 231 along a width line. The vertical portion 232 contacts an inner side surface 129 of the mold frame 120, and more specifically, the inner side surface 129 upward from the opening 127. A height of the vertical portion 232 is substantially equal to or less than a height of the opening 127. Accordingly, the vertical portion 232 extends upward from the horizontal portion 231, overlaps an opening 211 of the shielding case 200, but does not overlap the opening 127 of the mold frame 120. Accordingly, the opening 127 of the mold frame 120 overlaps the side wall portion 210 of the shielding case 200 and is not externally exposed.

According to a present embodiment, since the height of the vertical portion 232 is substantially equal to or less than the height of the opening 127, a hook 230 of the shielding case 200 can be inserted into the opening 127 of the mold frame 120 in the depth direction. In addition, upward movement of the side wall portion 210 of the shielding case 200 is restricted by the horizontal portion 231. Downward movement thereof is restricted by a bottom portion 220 of the shielding case 200 fastened to a bottom portion 171 of the bottom chassis 170. In addition, the opening 127 is covered by the side wall portion 210 of the shielding case 200.

Figure 12A:
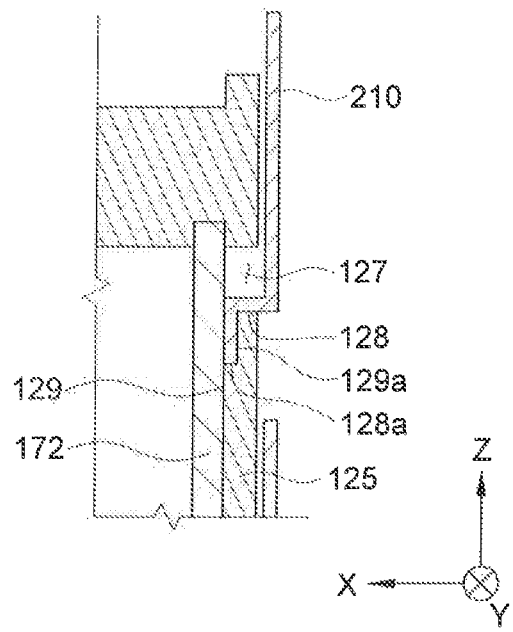
FIG. 12A is a cross-sectional view of a display device according to an embodiment of the present disclosure.
Figure 12B:
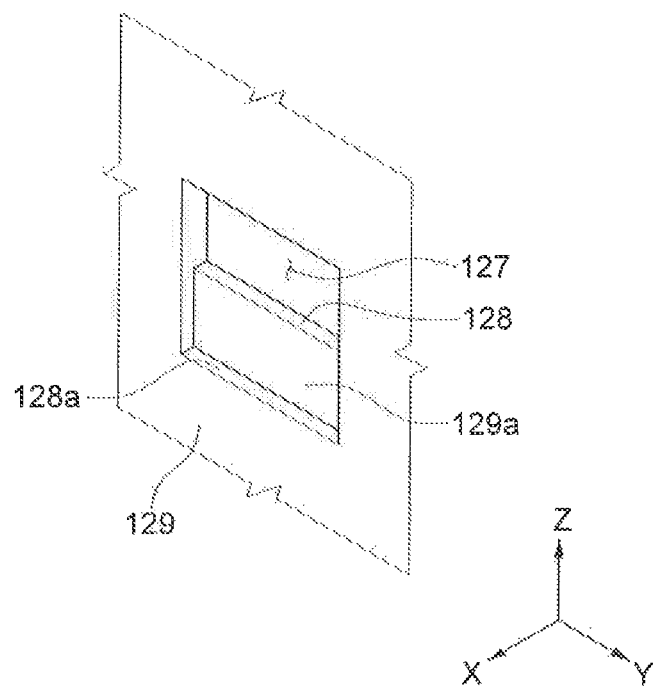
FIG. 12B is a perspective view illustrating an opening of FIG. 12A.

FIG. 12A is a cross-sectional view of a display device according to an embodiment of the present disclosure, and FIG. 12B is a perspective view of an opening of FIG. 12A. A present embodiment differs from above-described embodiments in the shape of an opening 127 of a mold frame 120.

Referring to FIGS. 12A and 12B, according to an embodiment, the opening 127 has a stepped surface so that a vertical portion 232 can be disposed between an outer side surface and an inner side surface 129 of a side wall portion 125 of the mold frame 120, when a side wall portion 172 of a bottom chassis 170 does not have an opening for the vertical portion 232.

More specifically, according to an embodiment, the outer side surface of the side wall portion 172 of the bottom chassis 170 contacts the inner side surface 129 of the side wall portion 125 of the mold frame 120, and a stepped surface 129a that faces inward is spaced outward from the outer side surface of the side wall portion 172 of the chassis 170. That is, the inner side surface 129 of the side wall portion 125 of the mold frame 120 and the stepped surface 129a that faces inward have different thicknesses in the depth direction. A distance between the stepped surface 129a and the outer side surface of the side wall portion 172 of the bottom chassis 170 is substantially equal to or greater than a thickness of the vertical portion 232. Accordingly, in a cross-sectional view, a groove is formed by the outer side surface of the side wall portion 172 of the bottom chassis 170, the stepped surface 129a, and a lower end that corresponds to a bottom surface 128a of an upwardly facing groove, and the vertical portion 232 is inserted into the groove. The vertical portion 232 contacts the stepped surface 129a. A horizontal portion 231 contacts an upwardly facing surface 128. A lower end of the vertical portion 232 contacts the bottom surface 128a of the upwardly facing groove.

According to a present embodiment, since an opening for the vertical portion 232 is not formed in the side wall portion 172 of the bottom chassis 170, the bottom chassis 170 can be easily manufactured and the opening 127 of the mold frame 120 can be completely covered.

Figure 13A:
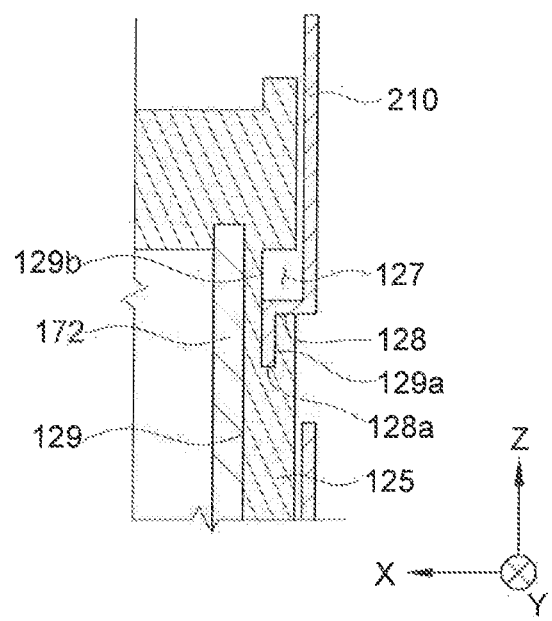
FIG. 13A is a cross-sectional view of a display device according to an embodiment of the present disclosure.
Figure 13B:
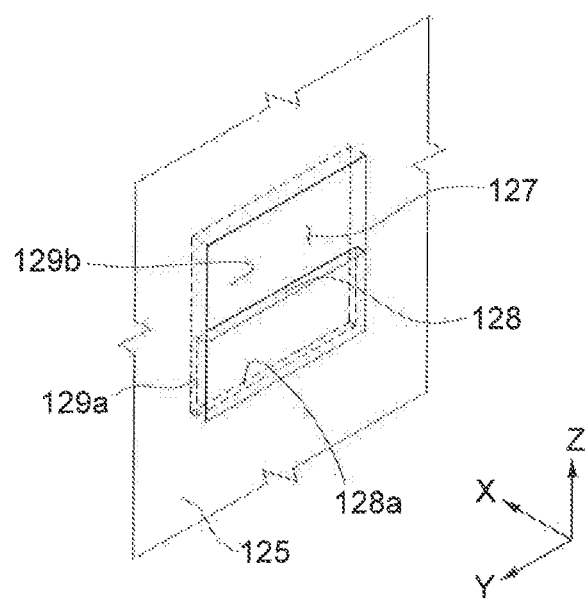
FIG. 13B is a perspective view of an opening of FIG. 13A.

FIG. 13A is a cross-sectional view of a display device according to an embodiment of the present disclosure, and FIG. 13B is a perspective view of an opening of FIG. 13A.

Referring to FIGS. 13A and 13B, there is no opening through a side wall portion 125 of a mold frame 120. That is, there is an indentation in an outer side surface of the side wall portion 125 of the mold frame 120 that does not penetrate through to an inner side surface 129 of the side wall portion 125 of the mold frame 120.

More specifically, according to an embodiment, in a cross-sectional view, a groove is defined by an outwardly facing surface 129b of the mold frame 120, an inwardly facing surface 129a of the mold frame 120, and an upwardly facing bottom surface 128a therebetween. A distance between the inwardly facing surface 129a and the outwardly facing surface 129b is substantially equal to or greater than a thickness of a vertical portion 232. Accordingly, the vertical portion 232 can be inserted into the groove. The vertical portion 232 contacts the inwardly facing surface 129a of the mold frame 120. A horizontal portion 231 contacts an upwardly facing surface 128. In addition, a lower end of the vertical portion 232 contacts the bottom surface 128a.

FIGS. 12B and 13B illustrate the shape of the hook 230 and the opening 127 of an embodiment described with reference to FIGS. 8A and 8B, but embodiments are not limited thereto. The shapes of the hooks 230 and opening 127 may be those of all other embodiments.

Figure 14A:
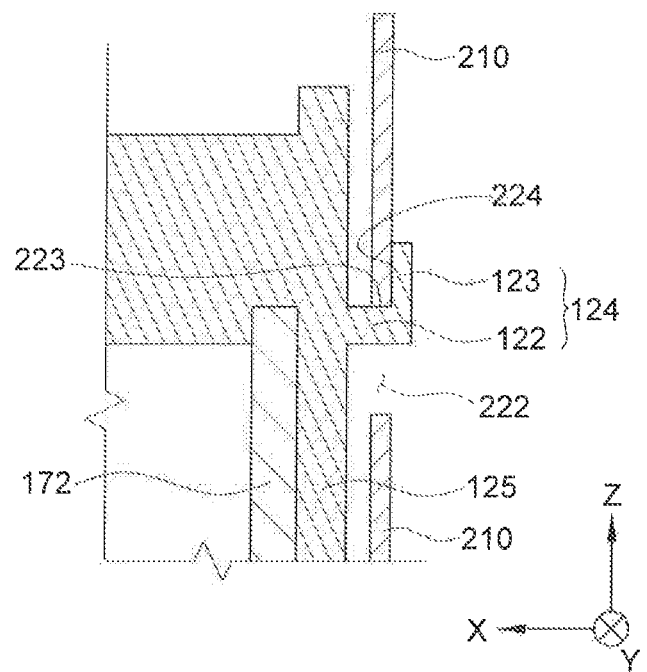
FIG. 14A is a cross-sectional view of a display device according to an embodiment a the present disclosure.
Figure 14B:
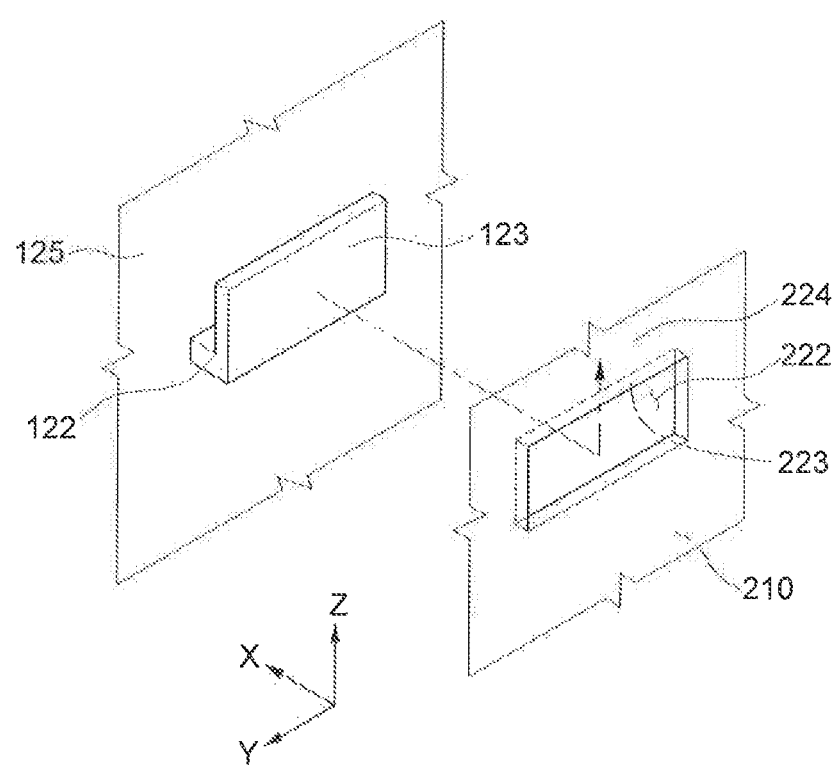
FIG. 14B is a perspective view illustrating a hook and an opening of FIG. 14A.
Figure 15:
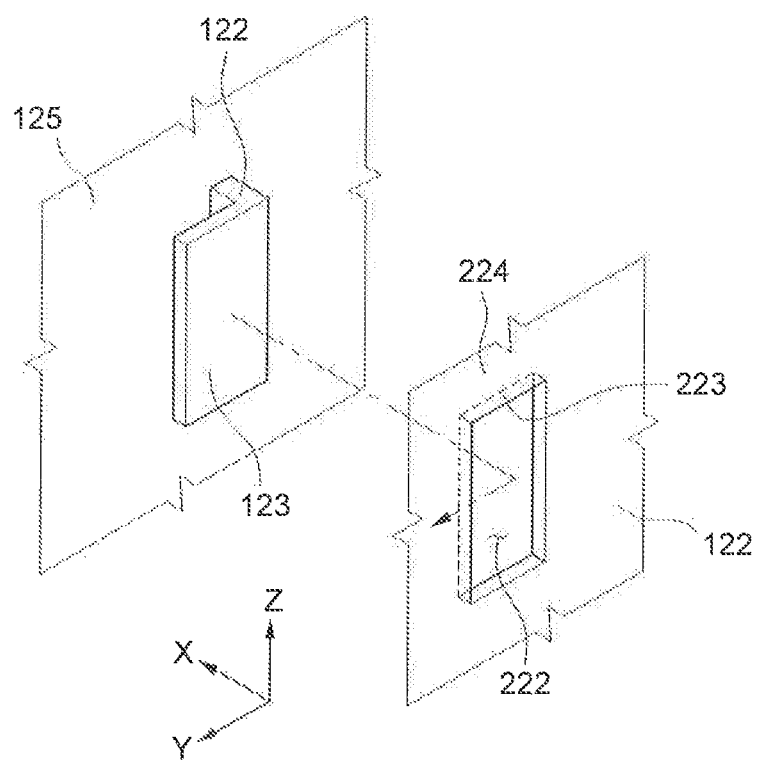
FIG. 15 illustrates an embodiment of FIGS. 14A and 14B according to an embodiment of the present disclosure.

FIG. 14A is a cross-sectional view of a display device according to an embodiment of the present disclosure, and FIG. 14B is a perspective view of a hook and an opening of FIG. 14A. FIG. 15 is an embodiment of FIGS. 14A and 14B. According to a present embodiment, a hook 124 is formed at a side wall portion 125 of a mold frame 120 and inserted into an opening 222 defined at a side wall portion 210 of a shielding case 200.

Referring to FIGS. 14A and 14B, according to an embodiment, the hook 124 of the side wall portion 125 of the mold frame 120 includes a horizontal portion 122 and a vertical portion 123. The horizontal portion 122 is a flat plate perpendicular to the side wall portion 210 of the shielding case 200 and parallel to the horizontal X-Y planar direction. The vertical portion 123 is a flat plate perpendicular to the horizontal direction and parallel to the side wall portion 210 of the shielding case 200. That is, the horizontal portion 122 is perpendicular to the vertical Z direction, and the vertical portion 123 is perpendicular to the depth X direction.

According to an embodiment, the horizontal portion 122 has a depth that corresponds to the sum of a thickness of the side wall portion 210 of the shielding case 200 and a distance between the side wall portion 125 of the mold frame 120 and the side wall portion 210 of the shielding case 200. The vertical portion 123 has a predetermined height that can prevent separation of the side wall portion 210 of the shielding case 200. The horizontal portion 122 and the vertical portion 123 have a predetermined width in the Y direction. The vertical height of the opening 222 of the shielding case 200 is substantially equal to or greater than the vertical height of the vertical portion 123.

According to an embodiment, the horizontal portion 122 extends outward from the side wall portion 125 of the mold frame 120 to contact a downwardly facing surface 223 of the opening 222 of the shielding case 200, and the vertical portion 123 extends upward from the horizontal portion 231 to contact an outer side surface 224 of the side wall portion 210 of the shielding case 200.

Referring to FIG. 15, according to an embodiment, a horizontal portion 122 is perpendicular to a side wall portion 210 of a shielding case 200 and parallel to X-Z plane. A vertical portion 123 is parallel to the Y-Z plane and the side wall portion 210 of the shielding case 200. That is, the horizontal portion 122 is perpendicular to the width direction, and the vertical portion 123 is perpendicular to the depth direction.

According to an embodiment, the horizontal portion 122 extends outward from a side wall portion 125 of a mold frame 120 to contact one side of a downwardly facing surface 223 of an opening 222. The vertical portion 123 extends in the width direction from the horizontal portion 231 to contact an outer side surface 224 of the side wall portion 210 of the shielding case 200.

Figure 16:
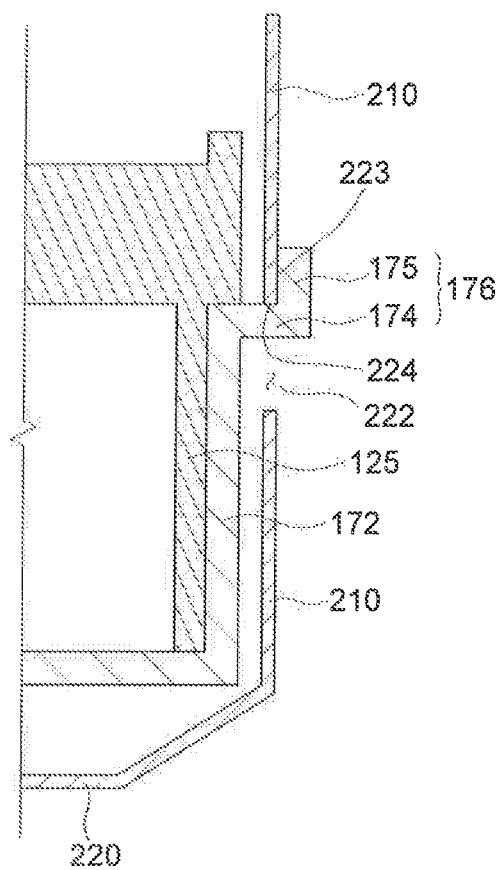
FIG. 16 is a cross-sectional view of a display device according to an embodiment of the present disclosure.

FIG. 16 is a cross-sectional view of a display device according to an embodiment of the present disclosure.

An embodiment illustrated in FIG. 16 differs from an embodiment illustrated in FIG. 14A in that a side wall portion 172 of a bottom chassis 170 is coupled to the outside of a side wall portion 125 of a mold frame 120.

Referring to FIG. 16, according to an embodiment, a hook 176 of the side wall portion 172 of the bottom chassis 170 includes a horizontal portion 174 and a vertical portion 175. The horizontal portion 174 is perpendicular to a side wall portion 210 of a shielding case 200, and the vertical portion 175 is parallel to the side wall portion 210 of the shielding case 200.

The horizontal portion 174 has a depth that corresponds to the sum of a thickness of the side wall portion 210 of the shielding case 200 and a distance between the side wall portion 172 of the bottom chassis 170 and the side wall portion 210 of the shielding case 200. The vertical portion 175 has a predetermined height that can prevent separation of the side wall portion 210 of the shielding case 200. The horizontal portion 174 and the vertical portion 175 have a predetermined width. A height of the opening 222 of the shielding case 200 is substantially equal to or greater than the height of the vertical portion 175.

According to an embodiment, the horizontal portion 174 extends outward from the side wall portion 172 of the bottom chassis 170 to contact a downwardly facing surface 223 of the opening 222, and the vertical portion 175 extends upward from the horizontal portion 231 to contact an outer side surface 224 of the side wall portion 210 of the shielding case 200.

According to an embodiment, the specific shape of the hook 176 and the opening 222 of the shielding case 200 are substantially the same to those of the hook 124 formed at the side wall portions 125 of the mold frame 120 and the opening 211 of the shielding case 200 illustrated in FIGS. 14A to 15B. Accordingly, detailed descriptions thereof will be omitted.

In addition, according to an embodiment, as illustrated in FIG. 16, when the side wall portion 172 of the bottom chassis 170 is coupled to the outside of the side wall portion 125 of the mold frame 120, the openings 127 of all embodiments described with reference to FIGS. 8A to 13B are formed at the side wall portion 172 of the bottom chassis 170 as is. Accordingly, detailed descriptions thereof will be omitted.

As set forth hereinabove, a display device according to one or more embodiments easily and detachably fastens the shielding case, and can maintain a stable coupling force against external impacts or restoring forces of the flexible printed circuit board.

While embodiments of the present disclosure has been illustrated and described with reference to exemplary embodiments thereof, it will be apparent to those of ordinary skill in the art that various changes in form and detail may be formed thereto without departing from the spirit and scope of exemplary embodiments of the present disclosure.

What is claimed is:

1. A display device comprising:
a display panel;
a mold frame that includes a support that supports a lower surface of the display panel, and a first side wall portion that extends from the support in a vertical direction;
a flexible printed circuit board disposed outside the first side wall portion and connected to the display panel;
a shielding case that includes a second bottom portion that covers a part of the flexible printed circuit board, and a third side wall portion that extends upward from the second bottom portion, is fastened to the first side wall portion and covers a part of the flexible printed circuit board;
a bottom chassis that includes a first bottom portion and a second side wall portion that extends upward from the first bottom portion; and
a back cover, wherein the back cover includes a third bottom portion that covers the first bottom portion and the second bottom portion, and a fourth side wall portion bent upward from the third bottom portion and that covers the first side wall portion, the second side wall portion, and the third side wall portion,
wherein the first side wall portion includes an opening, and the shielding case includes a hook that extends from the third side wall portion in the opening.

2. The display device of claim 1, wherein the opening penetrates the first side wall portion.

3. The display device of claim 1, wherein the opening does not penetrate the first side wall portion.

4. The display device of claim 1 wherein the hook comprises:
a horizontal portion that extends from the third side wall portion to the inside of the opening; and
a vertical portion that extends from the inside of the opening in a direction parallel to the first side wall portion.

5. The display device of claim 4, wherein the horizontal portion contacts an upwardly facing surface of the opening.

6. The display device of claim 5, wherein the vertical portion contacts an inwardly facing surface of the first side wall portion.

7. The display device of claim 6, wherein the vertical portion extends upward from the horizontal portion.

8. The display device of claim 7, wherein a height of the vertical portion is longer than a height of the opening.

9. The display device of claim 6, wherein a size of the vertical portion is substantially equal to or less than a size of the opening.

10. The display device of claim 9, wherein the horizontal portion is perpendicular to the vertical direction.

11. The display device of claim 10, wherein the vertical portion extends downward from the horizontal portion.

12. The display device of claim 10, wherein the vertical portion extends horizontally from the horizontal portion in a direction perpendicular to the vertical direction.

13. The display device of claim 9, wherein the horizontal portion is parallel to the vertical direction.

14. The display device of claim 13, wherein the vertical portion extends horizontally from the horizontal portion in a direction perpendicular to the vertical direction.

15. The display device of claim 4, wherein the horizontal portion contacts a downwardly facing surface of the opening.

16. The display device of claim 1, further comprising:
a circuit board disposed on a lower surface of the first bottom portion and connected to the display panel by the flexible printed circuit board, wherein the second bottom portion is fastened to the first bottom portion and covers the circuit board; and
a projection that separates the second bottom portion from the first bottom portion by a predetermined distance.

17. The display device of claim 1, wherein the display panel comprises:
a lower substrate supported by the support and an upper substrate on the lower substrate wherein an upper end of the third side wall portion is higher than a lower surface of the upper substrate.

18. The display device of claim 1, wherein a length of the third side wall portion in a horizontal direction is shorter than a length of the first side wall portion in a horizontal direction.

19. The display device of claim 1, wherein an upper end of the fourth side wall portion has a height substantially equal to a height of an upper surface of the display panel.

20. The display device of claim 1, wherein the opening and the hook do not overlap the flexible printed circuit board.

21. The display device of claim 20, wherein
the flexible printed circuit board comprises a plurality of flexible printed circuit boards spaced apart from each other, and
the opening and the hook are located between the plurality of flexible printed circuit boards.

22. The display device of claim 16, wherein the second bottom portion is fastened to the first bottom portion by a screw.

23. The display device of claim 2, further comprising a tape that covers the opening.

24. A display device, comprising:
a display panel;
a mold frame that includes a support that supports a lower surface of the display panel, and a first side wall portion that extends from the support in a vertical direction;
a bottom chassis that includes a first bottom portion and a second side wall portion that extends upward from the first bottom portion;
a circuit board disposed on a lower surface of the first bottom portion;
a flexible printed circuit board disposed outside the first side wall portion that connects the circuit board and the display panel;
a shielding case that includes a second bottom portion fastened to the first bottom portion and that covers the circuit board and a part of the flexible printed circuit board, and a third side wall portion that extends upward from the second bottom portion, is fastened to the first side wall portion and covers a part of the flexible printed circuit board; and
a back cover, wherein the back cover includes a third bottom portion that covers the first bottom portion and the second bottom portion, and a fourth side wall portion bent upward from the third bottom portion and that covers the first side wall portion, the second side wall portion, and the third side wall portion, wherein the third side wall portion is fastened to at least one of the first side wall portion or the second side wall portion using a book.

25. The display device of claim 24, wherein the second side wall portion is disposed outside the first side wall portion.

26. The display device of claim 25, wherein
the third side wall portion includes an opening, and
the second side wall portion includes a hook that extends from the first side wall portion into the opening.

27. The display device of claim 25, wherein
the second side wall portion includes an opening, and
the shielding case includes a hook that extends from the third side wall portion into the opening.

* * * * *